(12) United States Patent
Gravel

(10) Patent No.: US 11,492,208 B2
(45) Date of Patent: Nov. 8, 2022

(54) ROTATIVE LUMBER PIECE CHARGER FOR TRANSFERRING AND ANGULARLY ORIENTING LUMBER PIECES AND METHOD FOR PERFORMING SAME

(71) Applicant: Claude Gravel, Saint-Ferreol-des-Neiges (CA)

(72) Inventor: Claude Gravel, Saint-Ferreol-des-Neiges (CA)

( * ) Notice: Subject to any disclaimer, the term of this patent is extended or adjusted under 35 U.S.C. 154(b) by 0 days.

(21) Appl. No.: 17/261,163

(22) PCT Filed: Jul. 19, 2019

(86) PCT No.: PCT/CA2019/050996
§ 371 (c)(1),
(2) Date: Jan. 18, 2021

(87) PCT Pub. No.: WO2020/014790
PCT Pub. Date: Jan. 23, 2020

(65) Prior Publication Data
US 2021/0261353 A1    Aug. 26, 2021

Related U.S. Application Data

(60) Provisional application No. 62/700,566, filed on Jul. 19, 2018.

(51) Int. Cl.
*B65G 47/252* (2006.01)
*B65G 43/08* (2006.01)
(Continued)

(52) U.S. Cl.
CPC ........... *B65G 47/252* (2013.01); *B65G 43/08* (2013.01); *B65G 47/847* (2013.01);
(Continued)

(58) Field of Classification Search
CPC .... B65G 47/252; B65G 43/08; B65G 47/847; B65G 2201/0282; B65G 2203/0225; B65G 2203/041; G05B 13/024
(Continued)

(56) References Cited

U.S. PATENT DOCUMENTS 4,484,675 A    11/1984  Doherty et al.
5,518,106 A     5/1996  Allard
(Continued)

FOREIGN PATENT DOCUMENTS

CA    2185620 A1    3/1998
CA    2151768 C    12/2002
(Continued)

*Primary Examiner* — Gene O Crawford
*Assistant Examiner* — Lester Rushin, III
(74) *Attorney, Agent, or Firm* — Rodney J. Fuller; Booth Udall Fuller, PLC

(57) ABSTRACT

A rotative lumber piece charger for transferring lumber pieces. The rotative lumber piece charger comprises: a driving shaft rotating about a longitudinal axis and a transfer wheel comprising a main body mounted to the driving shaft and rotating therewith. The rotative lumber piece charger also comprises a lumber piece grasping assembly rotatably connected to the main body and rotatable with respect to the main body about a lumber rotation axis. The lumber piece grasping assembly is operative to grasp a section of a corresponding one of the lumber pieces, temporarily retain the section of the lumber piece and release the lumber piece. The rotative lumber piece charger further comprises an angular orientation control system connected to the lumber piece grasping assembly. The angular orientation control system rotates the lumber piece grasping assembly about the lumber rotation axis.

20 Claims, 14 Drawing Sheets

(51) Int. Cl.
*B65G 47/86* (2006.01)
*G05B 13/02* (2006.01)

(52) U.S. Cl.
CPC .... *G05B 13/024* (2013.01); *B65G 2201/0282* (2013.01); *B65G 2203/0225* (2013.01); *B65G 2203/041* (2013.01)

(58) Field of Classification Search
USPC ........................................................ 198/379
See application file for complete search history.

(56) References Cited

U.S. PATENT DOCUMENTS

| | | | |
|---|---|---|---|
| 5,605,216 | A | 2/1997 | Raybon et al. |
| 5,752,594 | A | 5/1998 | Fournier |
| 6,216,846 | B1 | 4/2001 | Gunnarsson |
| 6,446,785 | B1 | 9/2002 | Tremblay |
| 6,769,529 | B2 | 8/2004 | Fournier et al. |
| 6,782,991 | B2 | 8/2004 | Johansson |
| 7,171,278 | B2 | 1/2007 | Baker et al. |
| 8,104,604 | B2 | 1/2012 | Beaudet |
| 9,376,270 | B2 | 6/2016 | Petryshen et al. |
| 9,637,321 | B2 | 5/2017 | Petryshen et al. |
| 9,926,144 | B1 * | 3/2018 | Lepage ................. B65G 43/08 |
| 10,081,498 | B2 | 9/2018 | Petryshen et al. |
| 10,450,145 | B2 | 10/2019 | Petryshen et al. |
| 2004/0200694 | A1 | 10/2004 | Henderson et al. |
| 2005/0135917 | A1 | 6/2005 | Kauppila et al. |
| 2006/0180432 | A1 | 8/2006 | Kyrstein |
| 2008/0140248 | A1 | 6/2008 | Moore |
| 2009/0000910 | A1 | 1/2009 | Perreault |

FOREIGN PATENT DOCUMENTS

| | | | | |
|---|---|---|---|---|
| CA | 2426303 A1 * | 10/2004 | ............ | B27B 31/04 |
| CA | 2426303 A1 | 10/2004 | | |
| CA | 2910228 A1 * | 4/2016 | ............ | B27B 25/00 |
| CA | 2910228 A1 | 4/2016 | | |

* cited by examiner

ROTATIVE LUMBER PIECE CHARGER FOR TRANSFERRING AND ANGULARLY ORIENTING LUMBER PIECES AND METHOD FOR PERFORMING SAME

CROSS-REFERENCE TO RELATED APPLICATIONS

This application is the U.S. National Stage of International Application No. PCT/CA2019/050996, filed Jul. 19, 2019, which claims priority under 35USC§ 119(e) of US provisional patent application(s) 62/700,566 filed on Jul. 19, 2018, the contents of each of which are being hereby incorporated by reference in their entireties.

TECHNICAL FIELD OF THE INVENTION

The present invention relates to the fields of board transfer and board turning. More particularly, it relates to a lumber piece charger system for transferring lumbers between a first carrier assembly and a second carrier assembly while controlling the angular orientation of each lumber piece and to a method of operation of the system for performing the same.

BACKGROUND

In the field of lumber production, board turning systems are commonly used to selectively turn elongated pieces of lumber before a transformation stage. For example and without being limitative, board turning systems can be used to set the desired face of a piece of lumber to face either upwardly or downwardly, prior to a planning step.

Referring to FIGS. 1 and 1A (prior art), typically, to perform such turning of the elongated pieces 5, each one of the lumber pieces 5 are accumulated onto a first conveyor 1 (i.e. the lumber pieces 5 are arranged laterally adjacent to one another along a conveying axis X, onto the first conveyor 1) and subsequently loaded between cleats 6 (or cleat sets) of a second conveyor 2. Once loaded between the cleats 6 (also referred as lugs or cleat sets) of the conveyor 2, the lumber pieces 5 are subsequently scanned (or analyzed) and the acquired data is processed to determine the desired orientation of each lumber piece 5. Subsequently, each lumber piece 5 is selectively turned by a board turning system 8, if required, according to the desired orientation previously determined.

It will be understood that, as can be seen in FIGS. 1 and 1A (prior art), each operation of the above described sequence of operations necessitates space along the conveying axis X, thereby requiring a conveyors 1, 2 and the corresponding board turning system 8 having a substantial length to perform these operations as the lumber pieces 5 are conveyed along the conveying axis X. Moreover, the requirement of loading the lumber pieces 5 between cleats 6 (or cleat sets) of the second conveyor 2 causes a decrease in productivity, which can be a bottleneck along the production chain 9.

Rotating lumber pieces charger systems for transferring lumbers between a first carrier assembly and a second carrier assembly are also known. Such rotating lumber pieces charger systems (or loading systems) usually comprise a charging assembly with at least two transfer wheels spaced apart from one another and mounted to a main rotatable shaft, each one of the at least two transfer wheels having at least one timber piece grasping assembly operative to grasp a section of a lumber piece at a rotative grasping position, release the section of the lumber piece at a rotative release position, and retain the section of the lumber piece between the rotative grasping position and the rotative release position. Once again, known lumber pieces loading systems, however, tend to suffer from several drawbacks. Firstly, they cannot control the angular orientation of the lumber pieces being transferred, and hence cannot perform selective turning of the lumber pieces (i.e. selective change in the side of the lumber piece facing upwardly). Moreover, in embodiments where no turning of the pieces of lumber being transferred is desired (i.e. when no change in the side of the lumber piece facing upwardly is desired), they usually require that the second carrier assembly (or a corresponding transitional carrier assembly), onto which the lumber pieces are released, be positioned at a high vertical position to prevent a change in the orientation of the lumber piece caused by the rotational movement of the transfer wheels.

In view of the above, there is a need for an improved rotative lumber piece charger for transferring lumber pieces from a first carrier assembly to a second carrier assembly and a method of operation thereof, which would be able to overcome or at least minimize some of the above-discussed prior art concerns.

BRIEF SUMMARY OF THE INVENTION

In accordance with a first general aspect, there is provided a rotative lumber piece charger for transferring lumber pieces. The rotative lumber piece charger comprises: a driving shaft rotating about a longitudinal axis; a transfer wheel comprising a main body mounted to the driving shaft and rotating therewith; a lumber piece grasping assembly; and an angular orientation control system connected to the lumber piece grasping assembly. The lumber piece grasping assembly is rotatably connected to the main body of the transfer wheel and is rotatable with respect to the main body of the transfer wheel about a lumber rotation axis. It is operative to grasp a section of a corresponding one of the lumber pieces, temporarily retain the section of the lumber piece and release the lumber piece. The angular orientation control system selectively rotates the lumber piece grasping assembly about the lumber rotation axis.

In accordance with another general aspect, there is also provided a rotative lumber piece charger for concurrently transferring and angularly orienting lumber pieces being transferred along a conveying axis. The rotative lumber piece charger comprises a driving shaft extending along a longitudinal axis and substantially perpendicular to the conveying axis; at least one transfer wheel mounted onto a corresponding section of the driving shaft and rotating therewith; at least one lumber piece grasping assembly; and an angular orientation control system mounted to a corresponding one of the at least transfer wheel and operatively connected to a corresponding one of the at least one lumber piece grasping assembly. The at least one lumber piece grasping assembly is configured to grasp a section of a corresponding one of the lumber pieces, temporarily retain the section of the lumber piece and release the lumber piece. It is rotatably connected to a corresponding one of the at least transfer wheel and is selectively rotatable about a lumber rotation axis extending substantially parallel to the longitudinal axis to change an angular orientation of a corresponding one of the lumber pieces as it is temporarily retained. The angular orientation control system selectively rotates the corresponding lumber piece grasping assembly about the lumber rotation axis to control an angular orientation thereof.

In an embodiment, the lumber piece grasping assembly comprises a lumber supporting member engaging a first surface of the corresponding lumber piece and a lumber grasping member selectively engageable to a second surface of the lumber piece. The lumber supporting member is rotatably connected to the main body of the transfer wheel to rotate about the lumber rotation axis. The lumber grasping member is rotatably connected to the lumber supporting member.

In an embodiment, the angular orientation control system comprises an angular control actuator operatively connected to the lumber supporting member and driving the lumber supporting member in rotation about the lumber rotation axis, the angular control actuator being a rotative actuator.

In an embodiment, the angular orientation control system comprises a rotative shaft connected to the angular control actuator. The lumber supporting member is mounted to the rotative shaft and the angular control actuator selectively drives the rotative shaft in rotation.

In an embodiment, the angular control actuator is configured to monitor and control the angular position of the rotary shaft and automatically drive the rotative shaft and the lumber supporting member to an initial angular orientation, before the lumber supporting member reaches a rotative grasping position, for each complete rotation of the driving shaft.

In an embodiment, the angular orientation control system further comprises a return mechanism configured to drive the lumber supporting member to an initial angular orientation, before the lumber supporting member reaches a rotative grasping position, for each complete rotation of the driving shaft.

In an embodiment, the rotative lumber piece charger comprises a plurality of lumber piece grasping assemblies angularly spaced apart along the main body of the transfer wheel and rotating independently about a corresponding lumber rotation axis.

In an embodiment, the main body of the transfer wheel includes two discs mounted to the driving shaft and longitudinally spaced apart along the longitudinal axis, each disc having at least one cavity sized and shaped to receive a section of a corresponding lumber piece therein.

In accordance with another general aspect, there is also provided a method for transferring and angularly orienting successive lumber pieces between a first carrier assembly and a second carrier assembly. For each one of the successive lumber pieces, the method comprises the steps of: determining a desired angular orientation of the lumber piece at a rotative release position corresponding to a rotative position of a corresponding lumber piece grasping assembly for releasing the lumber piece onto the second carrier assembly; grasping the lumber piece from the first carrier assembly using the corresponding lumber piece grasping assembly; retaining the lumber piece by the lumber piece grasping assembly during rotative transfer by the lumber piece grasping assembly between the first carrier assembly and the second carrier assembly and concurrently selectively rotating the lumber piece grasping assembly about a lumber rotation axis for angularly orienting the lumber piece at the desired angular orientation; and releasing the lumber piece onto the second carrier assembly using the corresponding lumber piece grasping assembly.

In an embodiment, the step of determining the desired angular orientation of the lumber piece at a rotative release position comprises scanning the lumber piece using a vision system and generating optimization parameters.

In an embodiment, the step of determining a desired angular orientation of the lumber piece at a rotative release position includes processing the optimization parameters and generating orientation data corresponding to the desired angular orientation of the lumber piece.

In an embodiment, the step of rotating a transfer wheel having the lumber piece grasping assembly rotatably mounted thereon to perform rotative transfer of the lumber piece by the lumber piece grasping assembly between the first carrier assembly and the second carrier assembly.

BRIEF DESCRIPTION OF THE DRAWINGS

Other objects, advantages and features will become more apparent upon reading the following non-restrictive description of embodiments thereof, given for the purpose of exemplification only, with reference to the accompanying drawings in which.

DETAILED DESCRIPTION

In the following description, the same numerical references refer to similar elements. The embodiments, geometrical configurations, materials mentioned and/or dimensions shown in the figures or described in the present description are embodiments only, given solely for exemplification purposes.

Although the embodiments of the rotative lumber piece charger and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the rotative lumber piece charger, as will be briefly explained herein and as can be easily inferred herefrom by a person skilled in the art. Moreover, it will be appreciated that positional descriptions such as "above", "below", "left", "right" and the like should, unless otherwise indicated, be taken in the context of the figures and should not be considered limiting.

Moreover, although the embodiments as illustrated in the accompanying drawings comprise particular steps of a method, not all of these steps are essential and thus should not be taken in their restrictive sense. It is to be understood, as also apparent to a person skilled in the art, that other suitable sequence of operations may be used for the method, as will be briefly explained herein and as can be easily inferred herefrom, by a person skilled in the art, without departing from the scope of the invention.

To provide a more concise description, some of the quantitative and qualitative expressions given herein may be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

In the course of the present description, the term "selectively" is used to refer to an action being performed at a selected point in time and as a result of one or more operations intended to specifically cause the selected action.

Figure 1:
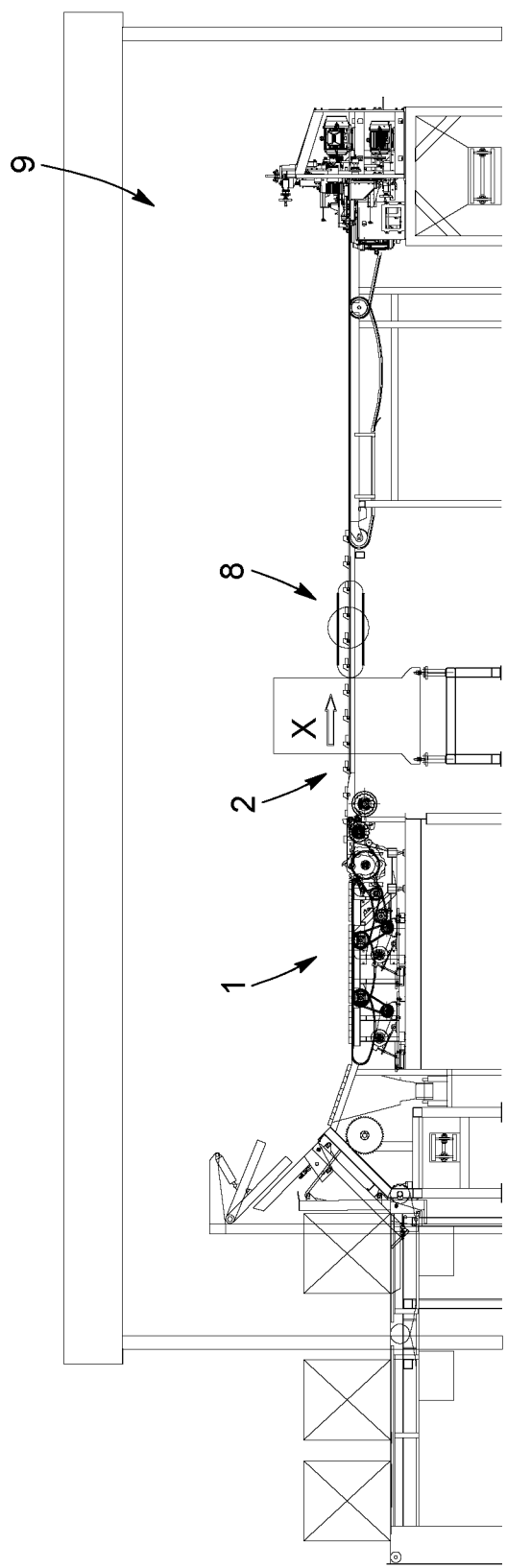
FIG. 1 is a side schematic representation of a prior art system for performing selective turning of lumber pieces, in accordance with an embodiment.
Figure 1A:
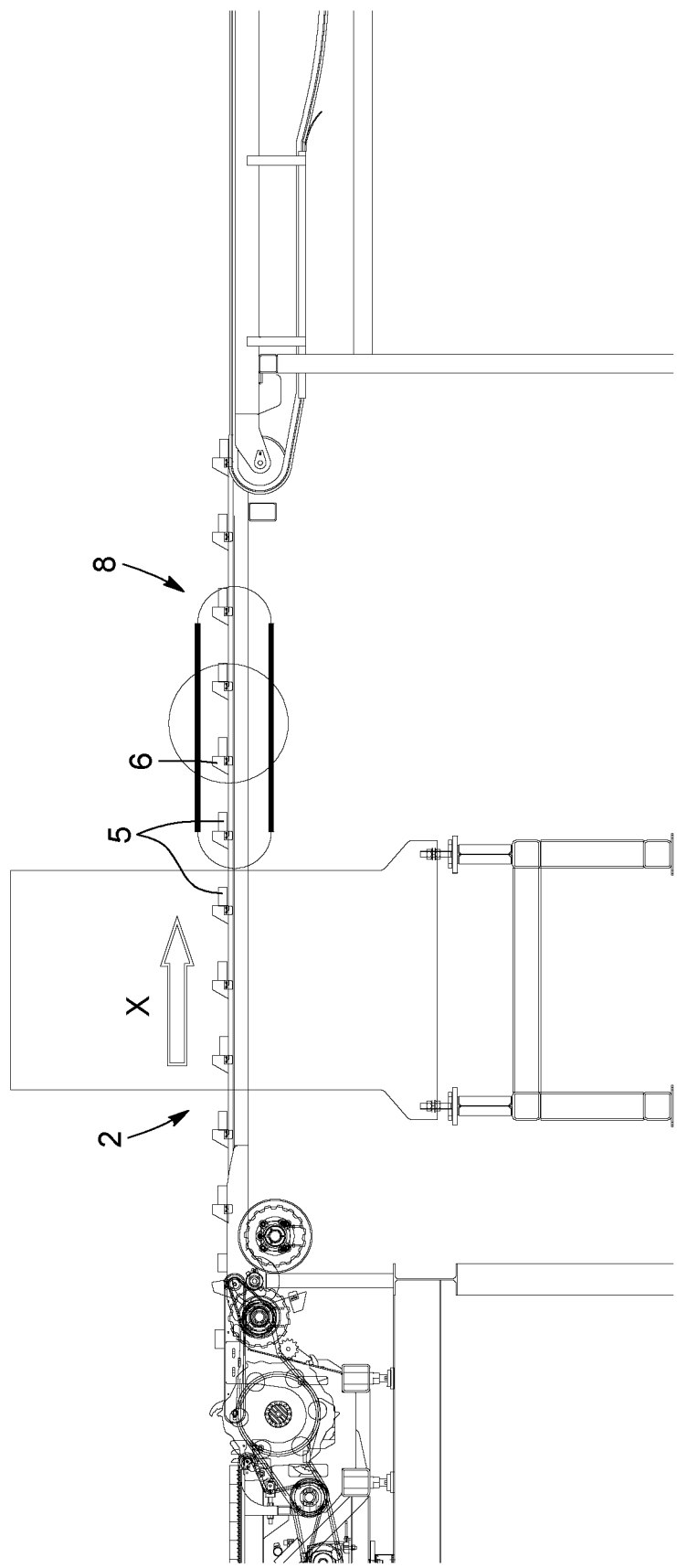
FIG. 1A is a close-up view of a section of the prior art system of FIG. 1.
Figure 2:
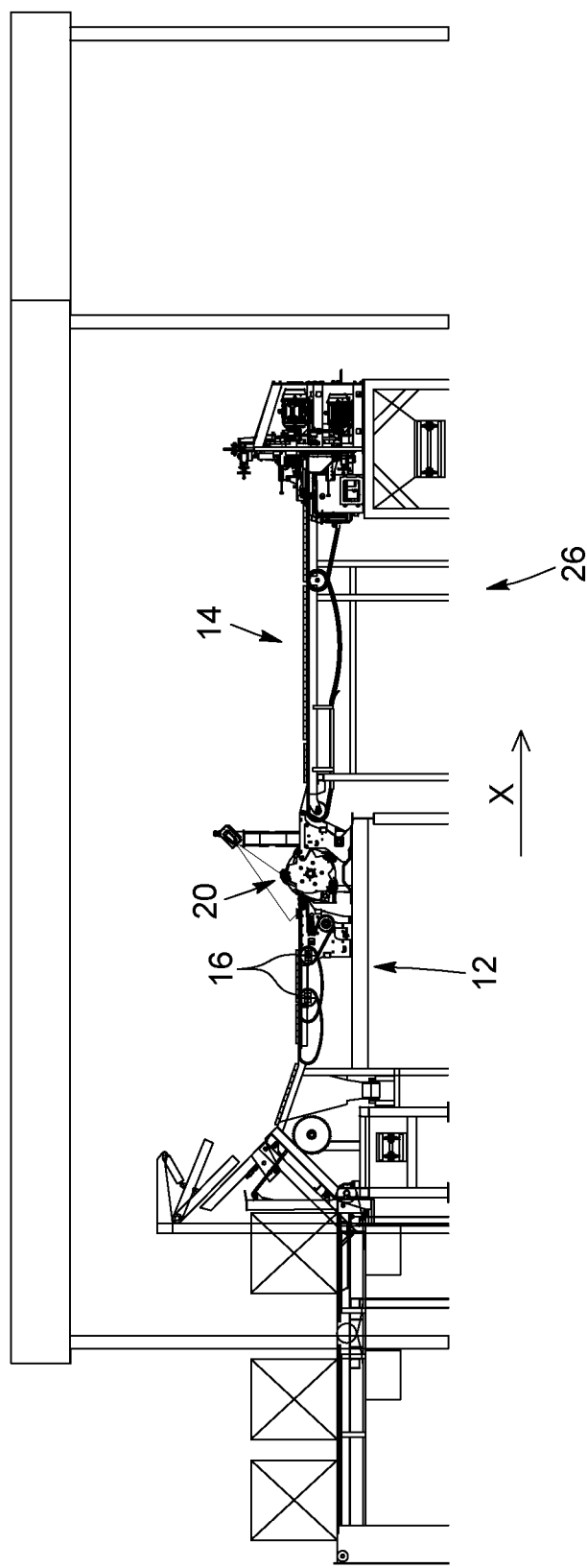
FIG. 2 is a side schematic representation of a rotative lumber piece charger for transferring and angularly orienting lumber pieces, in accordance with an embodiment, the rotative lumber piece charger being installed into a production line including a first carrier assembly and a second carrier assembly.
Figure 2A:
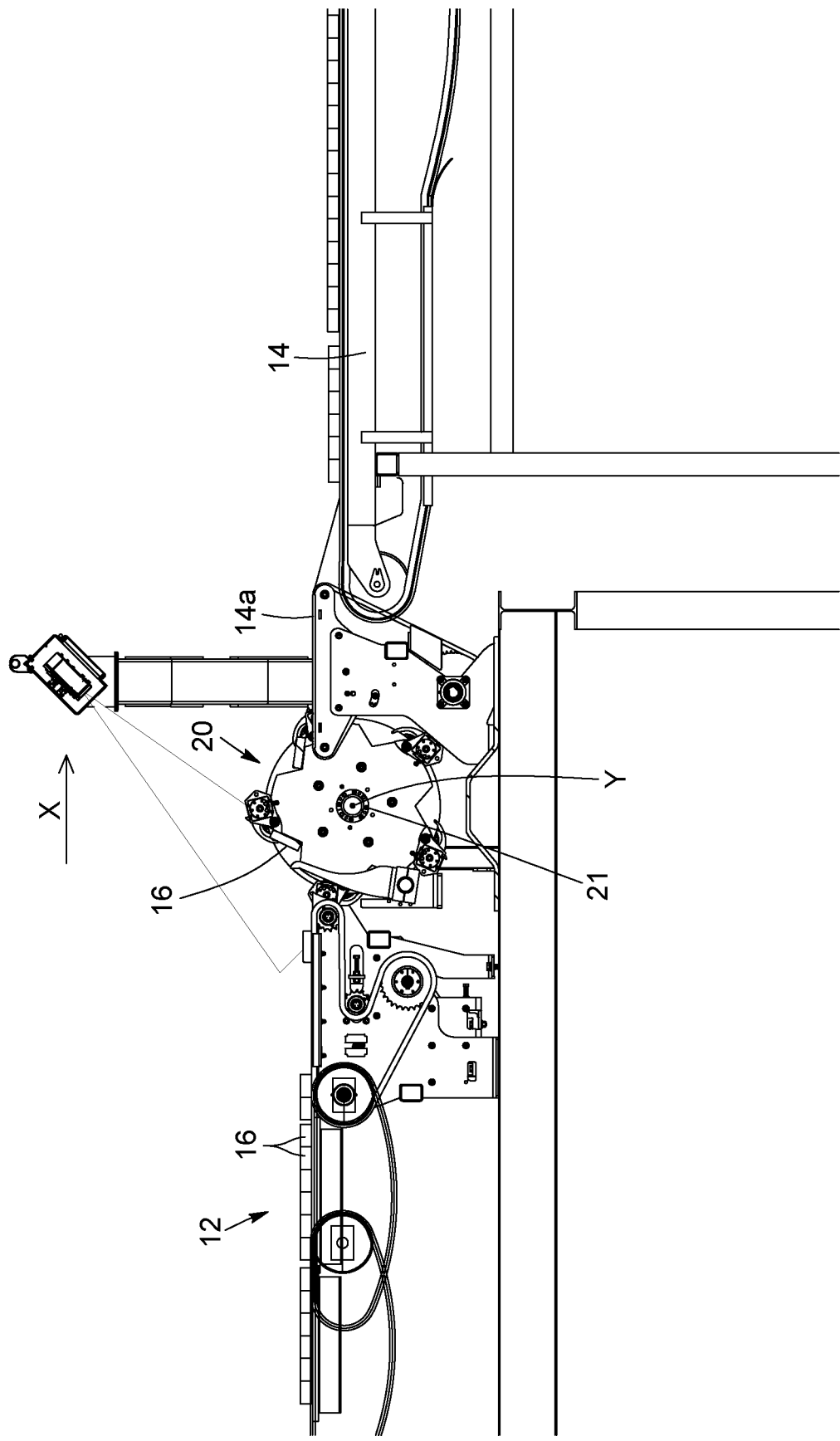
FIG. 2A is a close-up view of a section of the rotative lumber piece charger for transferring and angularly orienting lumber pieces of FIG. 2.

Referring generally to FIGS. 2 and 2A, in accordance with one embodiment, there is provided a rotative lumber piece charger 20 for transferring and angularly orienting lumber pieces 16. The rotative lumber piece charger 20 is configured to cooperate with a first carrier assembly 12 operative to convey successive lumber pieces 16 towards the rotative lumber piece charger 20 and at least a second carrier assembly 14 operative to receive the lumber pieces 16 from the rotative lumber piece charger 20, and subsequently convey the lumber pieces 16 away from the rotative lumber piece charger 20. In an embodiment, the second carrier assembly 14 can include a transitional carrier section 14a extending at an angle different from the second carrier assembly 14, proximate to the rotative lumber piece charger 20.

In the course of the present description, the terms "angularly orienting", "angular orientation", or similar terms, are used to define the orientation of the lumber pieces 16 or the corresponding components of the rotative lumber piece charger 20 with regard to a corresponding lumber rotation axis R extending generally in a parallel direction to a longitudinal axis Y defined by a driving shaft 21 of the rotative lumber piece charger 20, as will be described in more details below. The term "rotative positioning" or similar terms are used to refer to the angular position of components of the rotative lumber piece charger 20, which varies as a result of the rotation of the apparatus caused by the rotation of the driving shaft 21.

The lumber pieces 16 are elongated workpieces translating along a flow path (i.e. a path extending along a lumber conveying axis X). For example and without being limitative, the lumber pieces 16 can be elongated planed lumber, such as wood planks or the like. Hence, one skilled in the art will understand that the rotative lumber piece charger 20 can be part of a production line 26 which extends along the lumber conveying axis X and where the lumber pieces 16 are transversally conveyed along the lumber conveying axis X of the production line 26. In other words, the lumber pieces 16 are conveyed along the lumber conveying axis X of the production line (and extend longitudinally substantially transversally to the lumber conveying axis X), as they are conveyed along the first carrier assembly 12, the rotative lumber piece charger 20, and the second carrier assembly 14 (or an alternative inlet and/or outlet).

Figure 3:
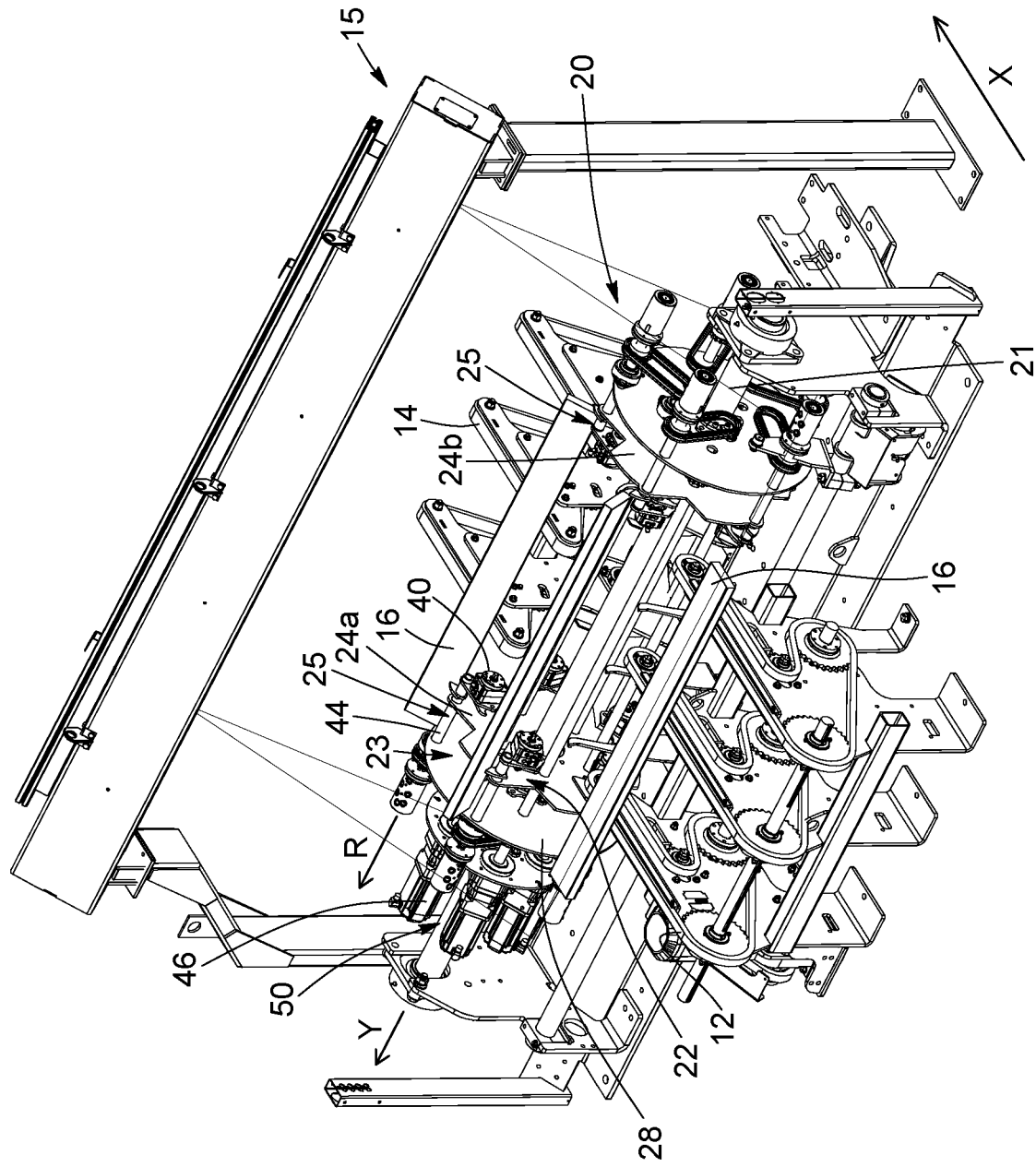
FIG. 3 is an isometric view of the rotative lumber piece charger for transferring and angularly orienting lumber pieces, in accordance with an embodiment.
Figure 3A:
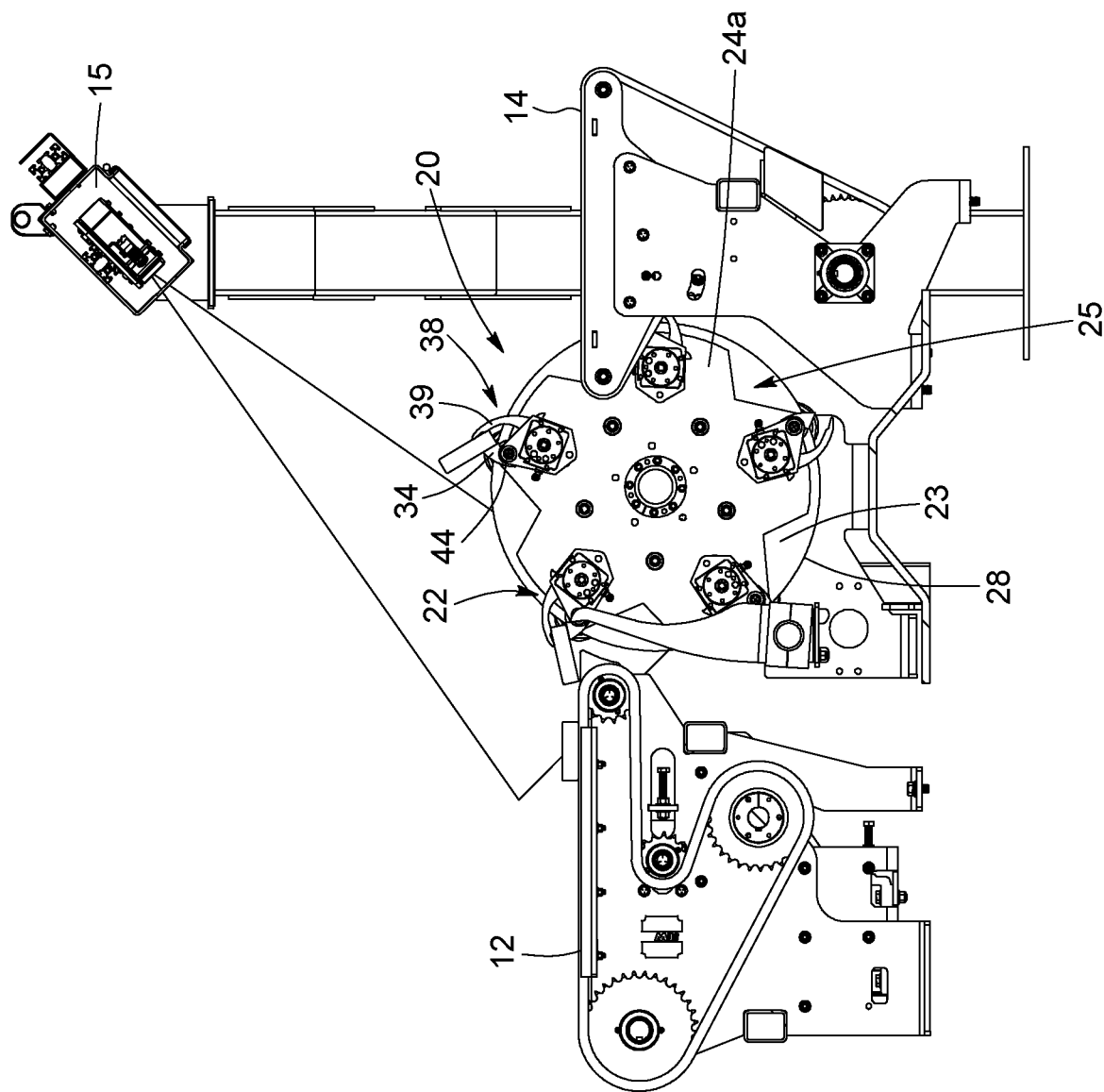
FIGS. 3A, 3B and 3C are cross-sectional side elevation views of a transfer wheel of the rotative lumber piece charger for transferring and angularly positioning lumber pieces of FIG. 3, the rotative lumber piece charger being shown with lumber piece grasping assemblies in different rotational position and angular orientation in each Figure.
Figure 3B:
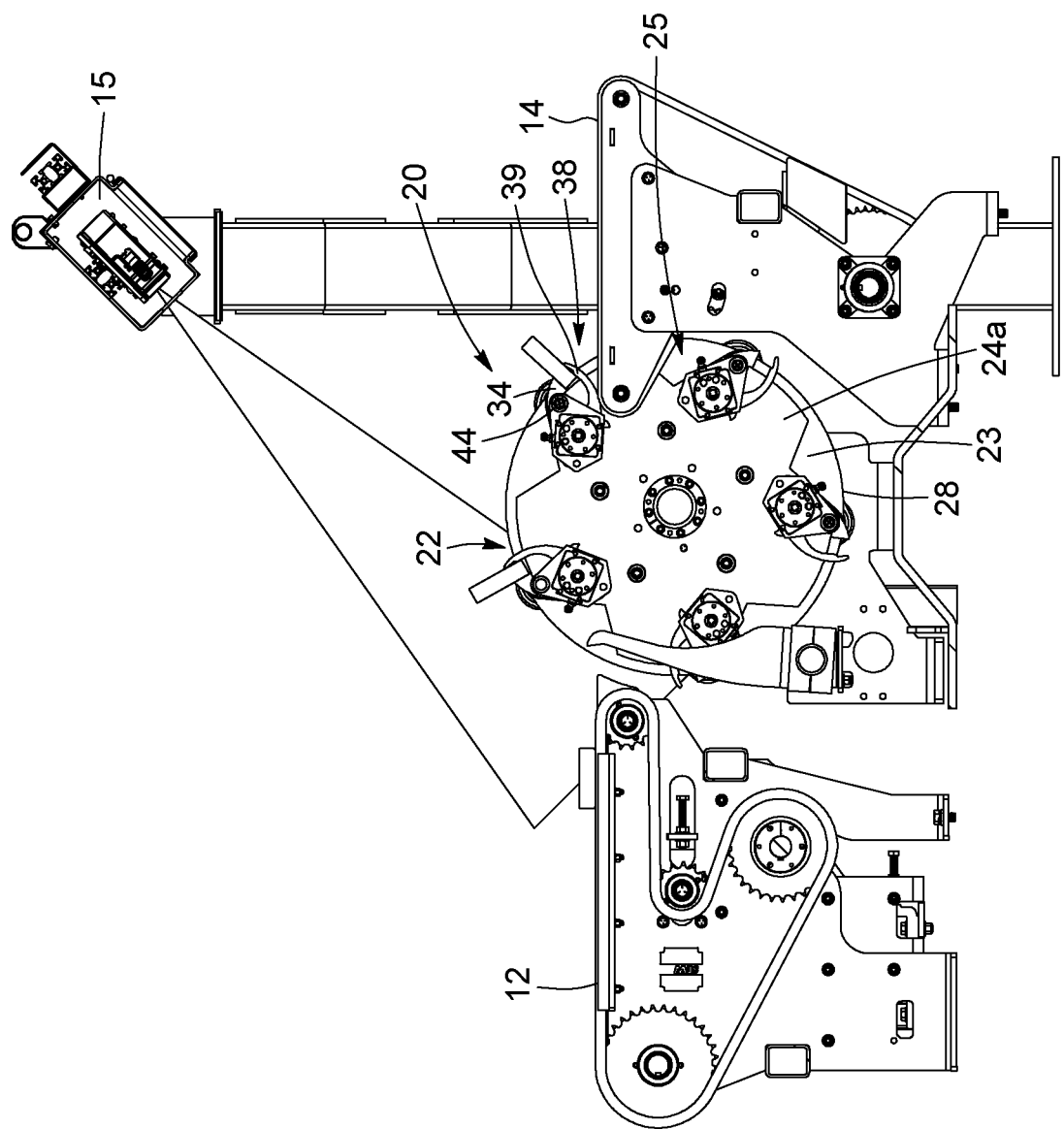
Figure 3C:
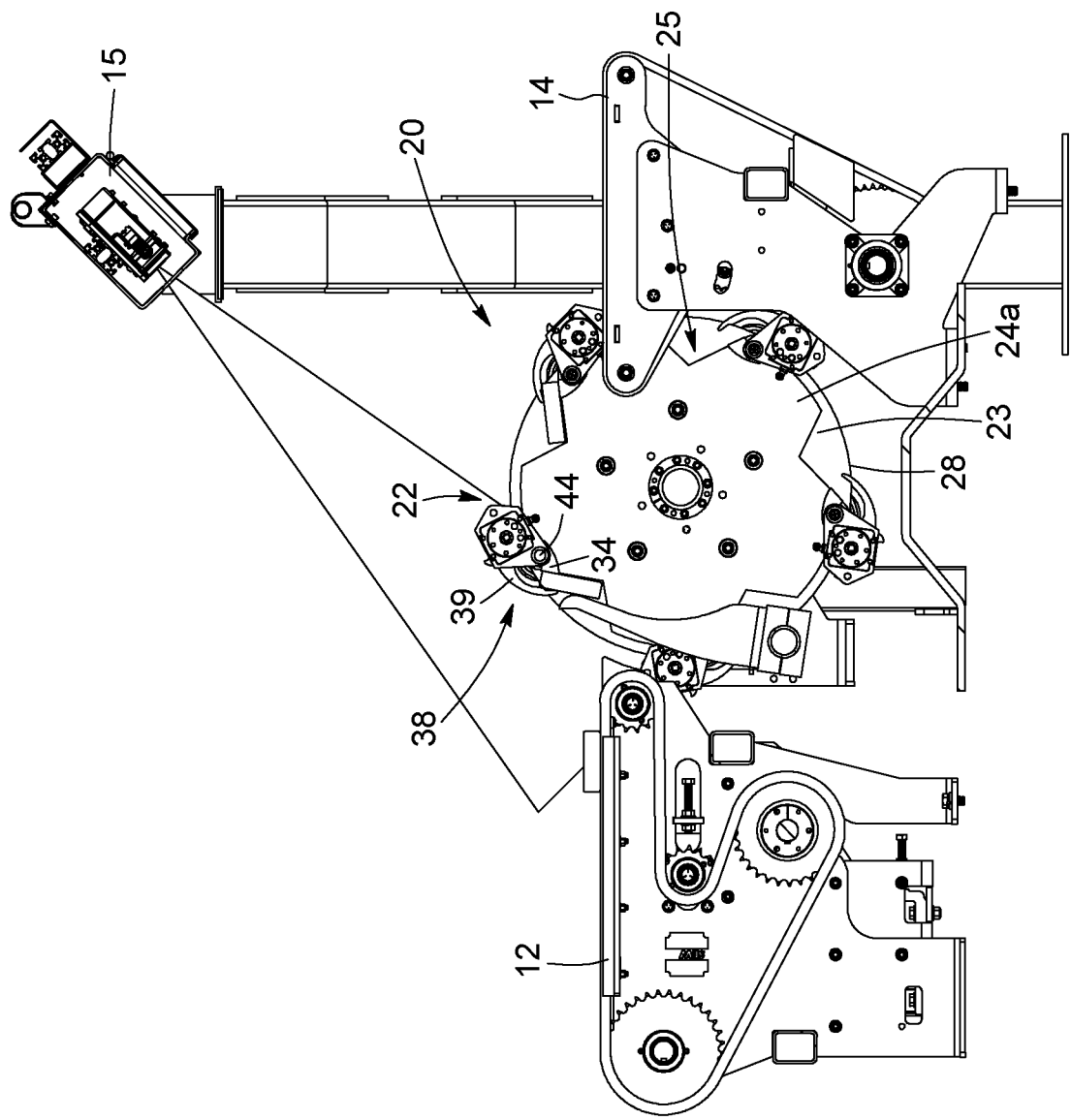

Referring to FIGS. 3 to 3C, the rotative lumber piece charger 20 is configured to transfer the lumber pieces 16 from the first carrier assembly 12 (or the alternative inlet) to the second carrier assembly 14 (or the alternative outlet) and control the angular orientation (i.e. the angular positioning relative to the lumber rotation axis R) of each one of the lumber pieces 16, as it is being transferred (i.e. as it is moved from the first carrier assembly 12 to the second carrier assembly 14) by the rotative lumber piece charger 20.

The rotative lumber piece charger 20 includes a driving shaft 21 rotatable about a longitudinal axis Y and two transfer wheels 28 spaced apart along the longitudinal axis Y. Each transfer wheel 28 includes a main body 23 rotating along with the driving shaft 21 and a plurality of rotatable lumber piece grasping assemblies 22 rotatably connected to the main body 23 and rotatable about a lumber rotation axis R (i.e. at least one lumber piece grasping assembly 22 rotatable with regard to the main body 23 about the lumber rotation axis R). In the embodiment shown, the main body 23 includes two discs 24A, 24B mounted to the driving shaft 21 and longitudinally spaced apart along the longitudinal axis Y. Each disc 24A, 24B includes a plurality of cavities 25 sized and shaped to receive a section of a corresponding lumber piece 16 therein. In the embodiment shown, a cavity 25 is defined and positioned adjacent to each one of the angularly spaced-apart plurality of rotatable lumber piece grasping assemblies 22.

Each lumber piece grasping assembly 22 is operative to grasp a section of a transferred lumber piece 16, temporarily retain the section of the transferred lumber piece 16 as the lumber piece grasping assembly 22 is selectively rotated with regard to the main body 23, and subsequently release the transferred lumber piece 16.

In an embodiment, a plurality of lumber piece grasping assemblies 22 are angularly spaced apart along the main body 23 and can be rotated independently along the corresponding lumber rotation axis R. Each lumber piece grasping assembly 22 can transfer a corresponding lumber piece 16. Hence, in operation, each lumber piece grasping assembly 22, grasps, maintains, controls the angular orientation and releases a corresponding lumber piece 16, such that multiple lumber pieces 16 can be simultaneously transferred and angularly oriented by the rotative lumber piece charger 20. Each lumber piece grasping assembly 22 is independent, such that each lumber piece 16 temporarily maintained by a corresponding lumber piece grasping assembly 22 can be independently angularly moved (i.e. turned about the lumber rotation axis R) to reach a desired angular orientation upon release, as it is being transferred.

To grasp, temporarily retain and subsequently release the lumber pieces 16, each lumber piece grasping assembly 22 includes at least one lumber supporting member 34 engaging a first surface of a corresponding lumber piece 16 and at least one lumber grasping member 38 selectively engageable to a second surface of the lumber piece 16, opposed to the first surface thereof. In the embodiment shown, the lumber grasping member 38, is embodied by a pivoting finger 39 pivotable between an engaged configuration and a disengaged configuration. In the engaged configuration, the pivoting finger 39 is pivoted to engage the second surface of the lumber piece 16, thereby sandwiching a portion of the lumber piece 16 between the lumber supporting member 34 and the pivoting finger 39 and firmly maintaining the lumber piece 16 therebetween. In the disengaged configuration, the pivoting finger 39 is pivoted away from the second surface of the lumber piece 16 and is disengaged therefrom. Therefore, when the pivoting finger 39 is pivoted from the engaged configuration to the disengaged configuration, the grip is released on the lumber piece 16. In an embodiment, the pivoting finger 39 is connected to an actuator 40 pivoting the pivoting finger 39 between the engaged configuration and the disengaged configuration and vice-versa.

The lumber grasping member 38 is connected to the lumber supporting member 34 to pivot thereabout, while rotating therewith (i.e. the lumber grasping member 38 pivots about the lumber supporting member 34 between the engaged configuration and the disengaged configuration and rotates along with the lumber supporting member 34, when the lumber supporting member 34 is rotated about the main body 23 of the corresponding transfer wheel 28).

One skilled in the art will understand that, in alternative embodiments, the lumber piece grasping assemblies 22 operative to firmly maintain the lumber pieces 16 being transferred, could differ from the embodiment shown. For example and without being limitative, two or more longitudinally spaced apart lumber supporting members 34 could be provided. Moreover, more than one pivoting finger 39 could be provided and/or a component different from a pivoting finger could be used for the lumber grasping member 38. For example and without being limitative, a longitudinally displaceable engaging member could be used.

To control the angular orientation of each lumber piece 16 (i.e. to selectively rotate the corresponding lumber piece about the rotating axis R) as it is being transferred by the rotative lumber piece charger 20, the rotative lumber piece charger 20 includes an angular orientation control system 50 controlling the angular orientation of each lumber piece grasping assembly 22 relative to the rotating axis R. In other words, the angular orientation control system 50 is operative to rotate the corresponding lumber piece grasping assembly 22 relative to the main body 23 of the corresponding transfer wheel 28, thereby allowing the control of the angular orientation of the lumber piece 16 temporarily retain thereby.

In the embodiment shown, the angular orientation control system 50 includes angular control actuators 46 each connected to a corresponding rotative shaft 44 and selectively driving the corresponding rotative shaft 44 in rotation. In the embodiment shown, the lumber supporting member 34 is mounted to the rotative shaft 44 rotatable relative to the main body 23 of the corresponding transfer wheel 28 of the rotative lumber piece charger 20. The angular control actuators 46 each control the angular orientation of the corresponding lumber supporting member 34 (and consequently the associated lumber grasping member 38) through rotation of the corresponding rotative shaft 44. The angular orientation control system 50 can drive the lumber supporting member 34 in a first rotational direction and in a second rotational direction, opposed to the first rotational direction, depending on the direction of the rotation of the rotative shaft 44. Hence, the angular orientation control system 50 can perform angular control of each lumber supporting member 34 during rotation of the driving shaft 21, thereby resulting in angular orientation control of the corresponding lumber piece 16 grasped by the corresponding lumber piece grasping assembly 22, during its transfer between the first carrier assembly 12 and the second carrier assembly 14.

One skilled in the art will easily understand that the angular orientation control system 50 can be connected to a different section of the corresponding lumber piece grasping assembly 22 (i.e. a component different than the lumber supporting members 34 of the lumber piece grasping assembly 22 could be mounted to the rotative shaft 44), in order to rotate the corresponding lumber piece grasping assembly 22 along with the rotative shaft 44.

The angular control actuators 46, each driving the corresponding rotative shaft 44 in rotation, are rotary actuators producing a rotary motion. Several types of rotary actuators can be used such as, without being limitative, an electric actuator (stepper motor, servomotor, etc.), a pneumatic actuator, a hydraulic actuator, or the like. Moreover, other mechanism for providing selective rotation of the lumber piece grasping assembly 22, such as, for example and without being limitative, a cam mechanism or the like could be used.

One skilled in the art will also understand that, in alternative embodiment, different mechanism could be provided to allow the actuator 46 to rotate a corresponding lumber piece grasping assembly 22. For example and without being limitative, the rotative shafts 44 of corresponding lumber piece grasping assemblies 22 of the two transfer wheels 28 can be shared between the transfer wheels 28 (i.e. a single rotative shaft 44 connected to the lumber supporting member 34 of the corresponding lumber piece grasping assembly 22 of the two transfer wheels 28) could be provided, such that a single actuator can be used for the corresponding lumber piece grasping assemblies 22 of multiple transfer wheels 28. One skilled in the art will understand that, in alternative embodiments (not shown), more or less than two transfer wheels 28 can also be used.

As mentioned above, the angular orientation control system 50 can drive the lumber supporting member 34 in a first rotational direction when the rotative shaft 44 rotated clockwise and in a second rotational direction, opposed to the first rotational direction, when the rotative shaft 44 is rotated counterclockwise. For example and without being limitative, in an embodiment, the angular orientation control system 50 can move the lumber supporting member 34 up to about 60 degrees in the first direction and up to about 60 degrees in the second direction, thereby providing an angular adjustment of about 120 degrees. In an alternative embodiment, the angular orientation control system 50 can move the lumber supporting member 34 up to about 45 degrees in the first direction and up to about 45 degrees in the second direction, thereby providing an angular adjustment of about 90 degrees.

The angular orientation control system 50 can perform individual angular control of each lumber supporting member 34 during rotation of the driving shaft 21, thereby resulting in angular orienting of the corresponding lumber piece 16 grasped by the corresponding lumber piece grasping assembly 22, during its transfer between the first carrier assembly 12 and the second carrier assembly 14. In other words, in the embodiment of FIGS. 3 to 3C, a rotation of the rotative shaft 44 corresponding to the associated lumber supporting member 34 is performed by the corresponding actuator 46, concurrently to the rotation of the driving shaft 21 and the main body 23 of the transfer wheel 28 mounted thereto, thereby allowing control of the angular orientation of each one of the lumber supporting member 34 and the associated lumber piece 16 during the time period spanning between the grasp of the lumber piece 16 from the first carrier assembly 12 and the release of the lumber piece 16 onto the second carrier assembly 14.

In an embodiment, the control of the angular orientation of the corresponding lumber piece 16 grasped by the corresponding lumber piece grasping assembly 22, during its transfer between the first carrier assembly 12 and the second carrier assembly 14, can allow the rotative lumber piece charger 20 to selectively maintain the same orientation of the transferred lumber piece 16 (i.e. release the lumber piece 16 onto the second carrier assembly 14 with the same face facing upwardly than when carried on the first carrier assembly 12) or turn the transferred lumber piece 16 (i.e. release the lumber piece 16 onto the second carrier assembly 14 with the opposed face facing upwardly than when carried on the first carrier assembly 12). Moreover, in an alternative embodiment, the control of the angular orientation of the corresponding lumber piece 16 grasped by the corresponding lumber piece grasping assembly 22, during its transfer between the first carrier assembly 12 and the second carrier assembly 14, can be used to maintain the same orientation of the transferred lumber piece 16 independently of the horizontal position of a conveying surface of the first carrier assembly 12 and the second carrier assembly 14. In other words, it can allow the same orientation of the transferred lumber piece 16 to be maintained with a positioning of the first carrier assembly 12 and the second carrier assembly 14 which would result in the transferred lumber piece 16 being automatically turned as a result of the rotative transfer in conventional rotative board loading apparatuses (not shown).

In an embodiment, following the change in the angular orientation of the corresponding lumber piece grasping assembly 22 and its lumber supporting member 34 by the angular orientation control system 50, the corresponding lumber piece grasping assembly 22 is driven back to an initial angular orientation before reaching the rotative grasping position (i.e. the rotative position of the corresponding lumber piece grasping assembly 22 where the lumber supporting member 34 is proximal to where the lumber pieces 16 are grasped from the first carrier assembly 12) for each complete rotation of the driving shaft 21. The initial angular orientation corresponds to the orientation in which the lumber supporting member 34 is oriented to grasp a corresponding lumber piece 16 from the first carrier assembly 12. Hence, each corresponding lumber piece grasping assembly 22 is driven back to an angular orientation where the lumber supporting member 34 can grasp a lumber piece 16 from the first carrier assembly 12, before it reaches the rotative grasping position where it engages a lumber piece from the first carrier assembly 12.

In the embodiment of FIGS. 3 to 3C, the return to the initial angular orientation is performed automatically by the actuator 46. For example and without being limitative, the actuator 46 can include a rotary position encoder (not shown) for monitoring and control of the angular position of the rotary shaft 44, with the actuator 46 being configured to automatically drive the rotative shaft 44 (and consequently the lumber supporting member 34) to the initial angular orientation where it can grasp a lumber piece 16 from the first carrier assembly 12, before the lumber supporting member 34 reaches the rotative grasping position where it engages a lumber piece from the first carrier assembly 12. In an embodiment, the driving shaft 21 can also include a rotary position encoder (not shown) in order to monitor the angular position of the driving shaft 21 (and consequently the rotative position of the lumber piece grasping assemblies 22 and the associated lumber supporting member 34) and allow the above described control of the each rotative shaft 44 with regard to the specific rotative position of the corresponding lumber piece grasping assembly 22.

In an embodiment, the rotative lumber piece charger 20 carries each transferred lumber pieces 16 between a grasping position and a release position along at least about 90° and less than about 270° and, in a particular embodiment, less than about 180°.

One skilled in the art will understand that, in alternative embodiments, the angular orientation control system 50 can be embodied by a driving mechanism different than the embodiment shown in FIGS. 3 to 3C. For example and without being limitative, FIGS. 4 to 6B, which will be discussed in more details below, show other possible alternatives.

In an embodiment, the rotative lumber piece charger 20 includes an electronic control system (not shown) operatively connected to the actuator 40 of the lumber grasping member 28, the actuator 46 of the angular orientation control system 50 and/or an actuator (not shown) of the driving shaft 21, such that the operations of the components of the lumber piece grasping assembly 22 and the angular orientation control system 50 for grasping, maintaining, angularly positioning and releasing the transferred lumber pieces 16 are synchronized and performed according to the corresponding rotary position thereof. Moreover, the electronic control system can control the actuators 40, 46 to synchronize the movement of the corresponding lumber piece grasping assemblies 22 of multiple transfer wheels 28. In an embodiment, the electronic control system can receive data relative to each lumber piece 16 to perform the specific angular orienting (e.g. to perform selective turning of the lumber piece 16 between the first carrier assembly and the second carrier assembly) for each one of the lumber piece 16 being transferred. In an embodiment, the data relative to each lumber piece 16 is acquired using a vision system 15 scanning the lumber pieces 16 as they are being conveyed on the first carrier assembly 12 and/or transferred as shown in FIGS. 3 to 3C (or during previous manutention thereof).

In view of the above, the rotative lumber piece charger 20 is configured to allow the lumber pieces 16 to be angularly oriented during transfer thereof between components of a production line (e.g. between the first carrier assembly 12 and the second carrier assembly 14). Therefore, in operation, the above described rotative lumber piece charger 20 provides a solution that minimizes the space along a production line for performing multiple tasks by combining the angular orienting of the lumber pieces 16 (e.g. to perform selective turning of the lumber pieces 16) to the transfer performed by the rotative lumber piece charger 20. Hence, in an embodiment, the angular orienting of the lumber pieces 16 does not interfere or negatively impact the speed of operation of the rotative lumber piece charger 20, the driving shaft 21 of the rotative lumber piece charger 20 being allowed to rotate continuously to transfer the corresponding lumber piece 16 from the first carrier assembly 12 to the second carrier assembly 14 (or another alternative outlet).

For example and without being limitative, FIGS. 3A to 3C show the rotative lumber piece charger 20 with the lumber piece grasping assembly 22 positioned according to different angular orientations. FIGS. 3A and 3B show the lumber piece grasping assembly 22 having grabbed a piece of lumber 16 without modification of the angular orientation of the lumber piece grasping assemblies 22 during the transfer of the lumber pieces 16. In other words, in FIGS. 3A and 3B, the lumber piece grasping assemblies 22 rotate as a result of the rotation of the corresponding transfer wheel 28, with no further rotation of the lumber piece grasping assembly 22 performed by the angular position control assembly 50. Hence, the lumber piece 16 is oriented to be released in the opposite orientation as the orientation it was grasped (i.e. the lumber piece 16 is turned to be released on the second carrier assembly with the opposed face facing upwardly than when carried on the first carrier assembly 12, as a result of the movement of the lumber piece grasping assembly 22 being rotated along with the rotation of the corresponding transfer wheel 28 only). Conversely, FIG. 3C shows the angular orientation of the lumber piece grasping assemblies 22 being modified during the transfer of the lumber pieces. In other words, in FIG. 3C, the lumber piece grasping assemblies 22 are rotated by the angular position control assembly, to change the angular orientation of the piece of lumber 16, concurrently as it is rotated according to the rotation of the corresponding transfer wheel 28. Hence, the lumber piece 16 is oriented to be released in the same orientation as the orientation it was grasped (i.e. the lumber piece 16 is turned to be released on the second carrier assembly with the same face facing upwardly than when carried on the first carrier assembly 12, as a result of the movement of the lumber piece grasping assembly 22 being further rotated by the angular position control assembly 50, while it rotates along with the corresponding transfer wheel 28).

Figure 4:
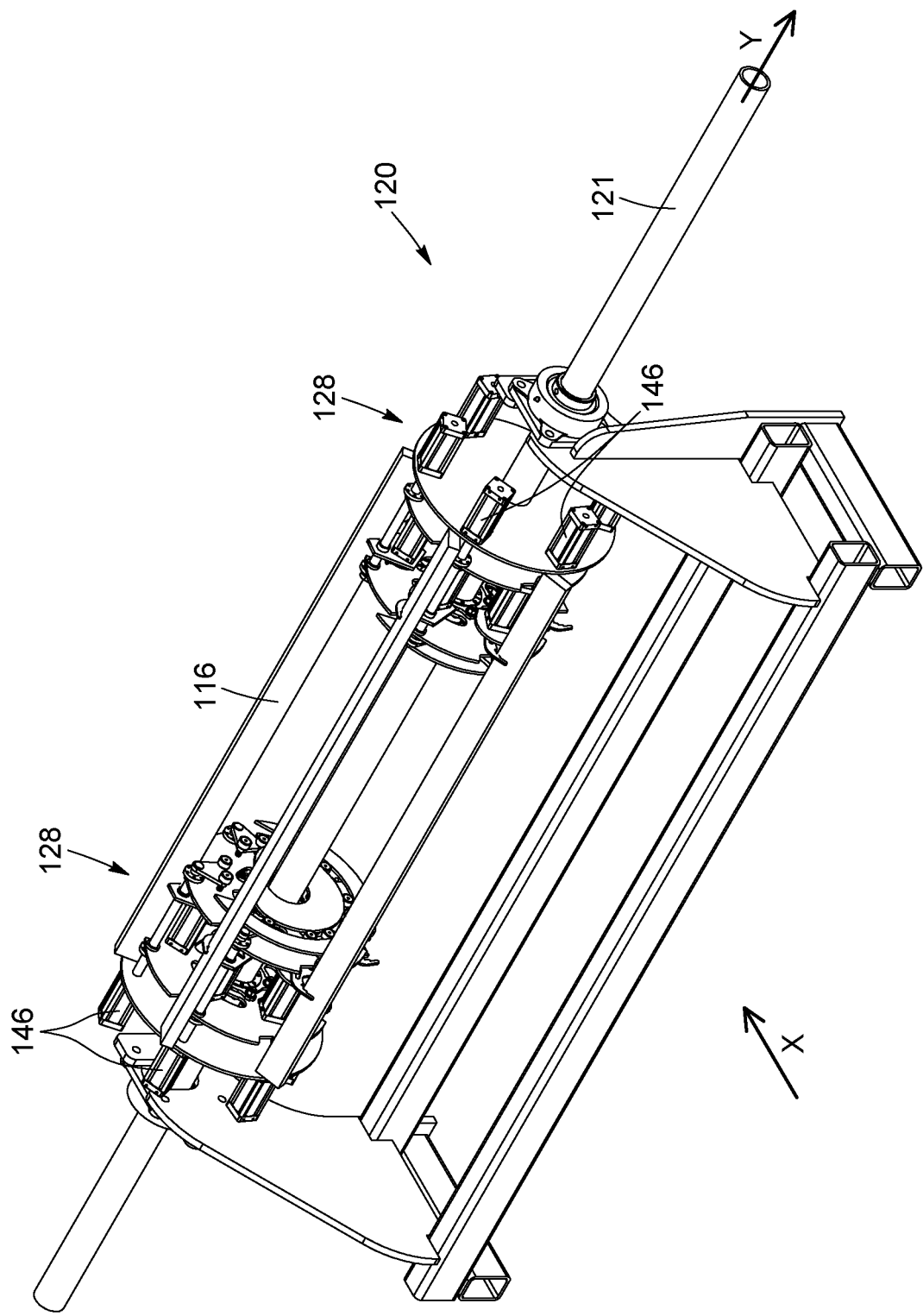
FIG. 4 is a perspective view of the rotative lumber piece charger for transferring and angularly positioning lumber, in accordance with an alternative embodiment and shown with lumber pieces being transferred.
Figure 4A:
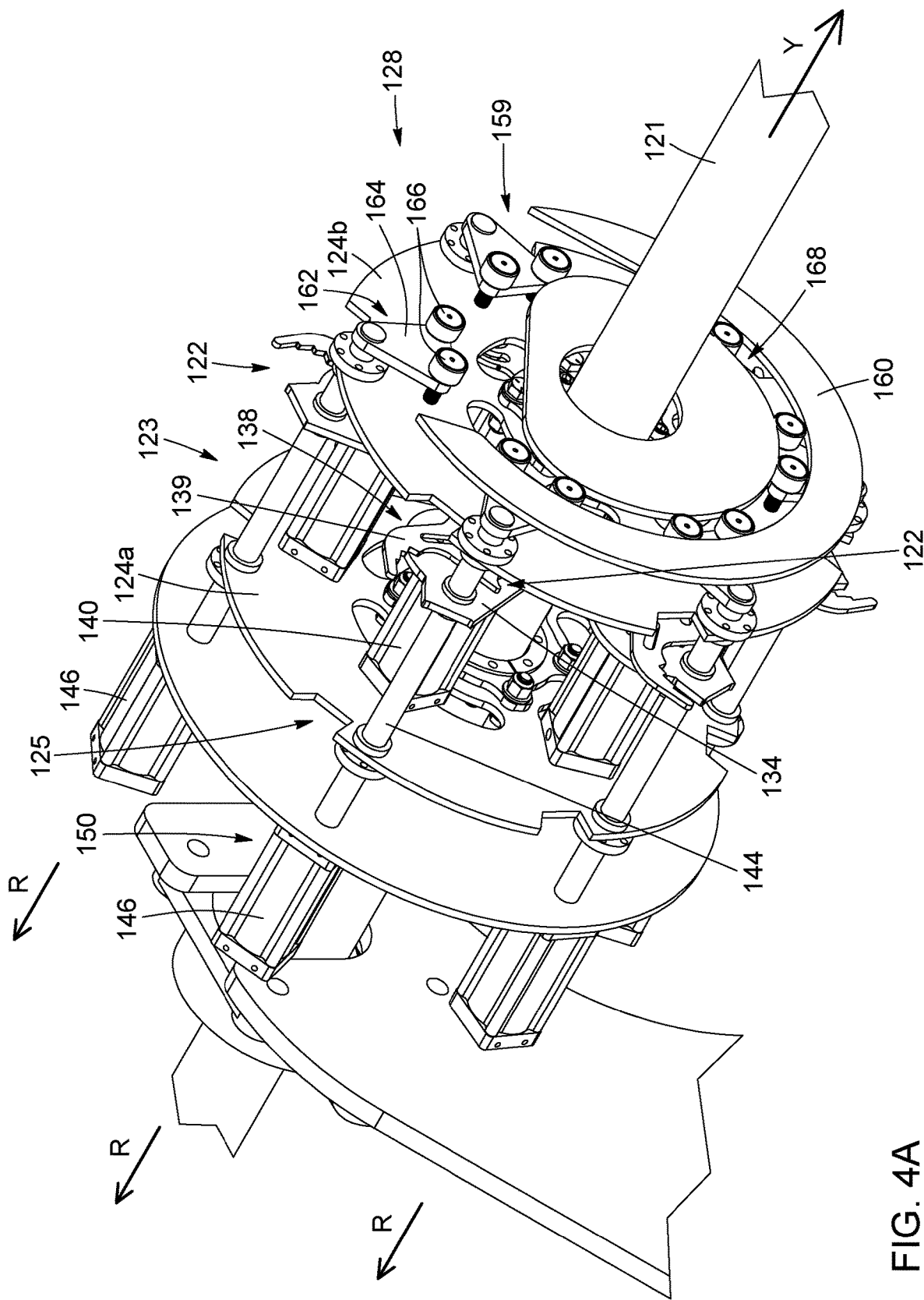
FIG. 4A is an enlarged view of a transfer wheel of the rotative lumber piece charger for transferring and angularly positioning lumber of FIG. 4, without the lumber pieces being transferred.

Now referring to FIGS. 4 and 4A, there is shown an alternative embodiment of the rotative lumber piece charger 120 wherein similar features are numbered using the same reference numerals in the 100 series. The rotative lumber piece charger 120 is again configured to transfer the lumber pieces, for example, between a first carrier assembly (not shown) and a second carrier assembly (not shown) (or an alternative outlet) while performing angular movement (i.e. angular orientation) of each one of the lumber pieces being transferred.

Again, the rotative lumber piece charger 120 includes a driving shaft 121 rotatable about a longitudinal axis Y and two transfer wheels 128 spaced apart along the longitudinal axis Y. Each transfer wheel 128 includes a main body 123 rotating along with the driving shaft 121 and a plurality of rotatable lumber piece grasping assemblies 122 (i.e. lumber piece grasping assemblies 122 rotatable about the main body 123) and angularly spaced-apart from one another therealong. In the embodiment of FIGS. 4 and 4A, the main body once again 123 includes two discs 124A, 124B mounted to the driving shaft 121 and longitudinally spaced apart along the longitudinal axis Y. Each disc 124A, 124B includes a plurality of cavities 125 sized and shaped to receive a section of a corresponding lumber piece 116 therein.

In the embodiment of FIGS. 4 and 4A, the angular orientation control system 150 further includes a return mechanism 159 operative to drive each one of the lumber supporting members 134 back to the initial angular orientation, before reaching the rotative grasping position. The return mechanism 159 includes a track follower 162 for each lumber supporting member 134 and engageable with a guiding wheel 160. The guiding wheel 160 is a fixed wheel and does not rotate along with the driving shaft 121, such that the transfer wheels 128 including the main body 123 and the lumber supporting members 134 rotate around the guiding wheel 160. In the embodiment shown, the track follower 162 is mounted to the corresponding rotative shaft 144 at a distal end thereof (i.e. at an end opposed to the end of the rotative shaft 144 connected to the angular control actuator 146) and includes a body 164 having at least one roller 166 mounted thereto (e.g. two rollers 166 in the embodiment shown) and rotatable thereabout. The body 164 is mounted to the corresponding rotative shaft 144 and rotates therewith (i.e. rotative movement of the body 164 drives the rotative shaft 144 in rotation). The guiding wheel 160 includes a guiding channel 168 extending along a section thereof and at least partially between the rotative release position of the lumber supporting member 134 (i.e. the rotative position of the lumber supporting member 134 proximal to where the lumber pieces 116 are released onto the second carrier assembly (not shown)) of the lumber supporting member 134 and the rotative grasping position (i.e. the rotative position of the lumber supporting member 134 proximal to where the lumber pieces 116 are grasped from the first carrier assembly (not shown)) of the lumber supporting member 134. The guiding channel 168 has an entrance angularly located following the rotative release position of the lumber supporting member 134 and configured to guide the rollers 166 of the track follower 162 therein. The guiding channel 168 is further configured to engage the rollers 166 and drives the body 164 of the track follower 162 in the desired angular orientation, thereby resulting in the rotative shaft 144 and the lumber supporting member 134 mounted thereto to the desired initial angular orientation before reaching the rotative grasping position.

When the rollers 166 of the track follower 162 are outside of the guiding channel 168 (i.e. are not engaged into the guiding channel 168, as the lumber supporting member 134 is at a rotative position where the guiding wheel 160 is free of guiding channel 168), the return mechanism 159 does not restrict the angular orientation of the track follower 162 and the corresponding lumber supporting member 134. Hence, the angular orienting of the lumber supporting member 134, is performed by the angular orientation control system 150, while the rotative positioning of the track follower 162 and the corresponding lumber supporting member 134 correspond to a rotative position where the guiding wheel 160 is free of guiding channel 168.

One skilled in the art will understand that, in an alternative embodiment, such as, for example and without being limitative, the embodiment which will be described below in connection to FIGS. 5A and 5B, the return mechanism 159 can differ from the embodiment shown while still driving each one of the lumber supporting members 134 back to an initial angular orientation, before the corresponding lumber supporting member 134 reaches the rotative grasping position.

Once again, the rotative lumber piece charger 120 includes an electronic control system (not shown) operatively connected to the actuator 140 of the lumber grasping member 128 and/or the angular control actuators 146 of the angular orientation control system 150, such that the operations of the components of the lumber piece grasping assembly 122 and the angular orientation control system 150 for grasping, maintaining, angularly positioning and releasing the transferred lumber pieces 116 are synchronized and/or to perform the specific angular orienting (e.g. to perform selective turning of the lumber piece 116 between the first carrier assembly and the second carrier assembly) for each one of the lumber piece 116 being transferred. Moreover, the electronic control system can control the angular control actuators 146 to synchronize the movement of corresponding lumber piece grasping assembly 122 of the two transfer wheels 128.

Once again, it will be understood that the rotative shafts 144 of the corresponding lumber piece grasping assembly 122 of the two transfer wheels 128 can be shared between the transfer wheels 128 (i.e. a single rotative shaft 144 connected to the lumber supporting member 134 of the corresponding lumber piece grasping assembly 122 of the two transfer wheels 128) such that a single actuator can be used for the corresponding lumber piece grasping assembly 122 of multiple transfer wheels. One skilled in the art will understand that, in alternative embodiments (not shown), more or less than two transfer wheels 128 can be used.

Figure 5A:
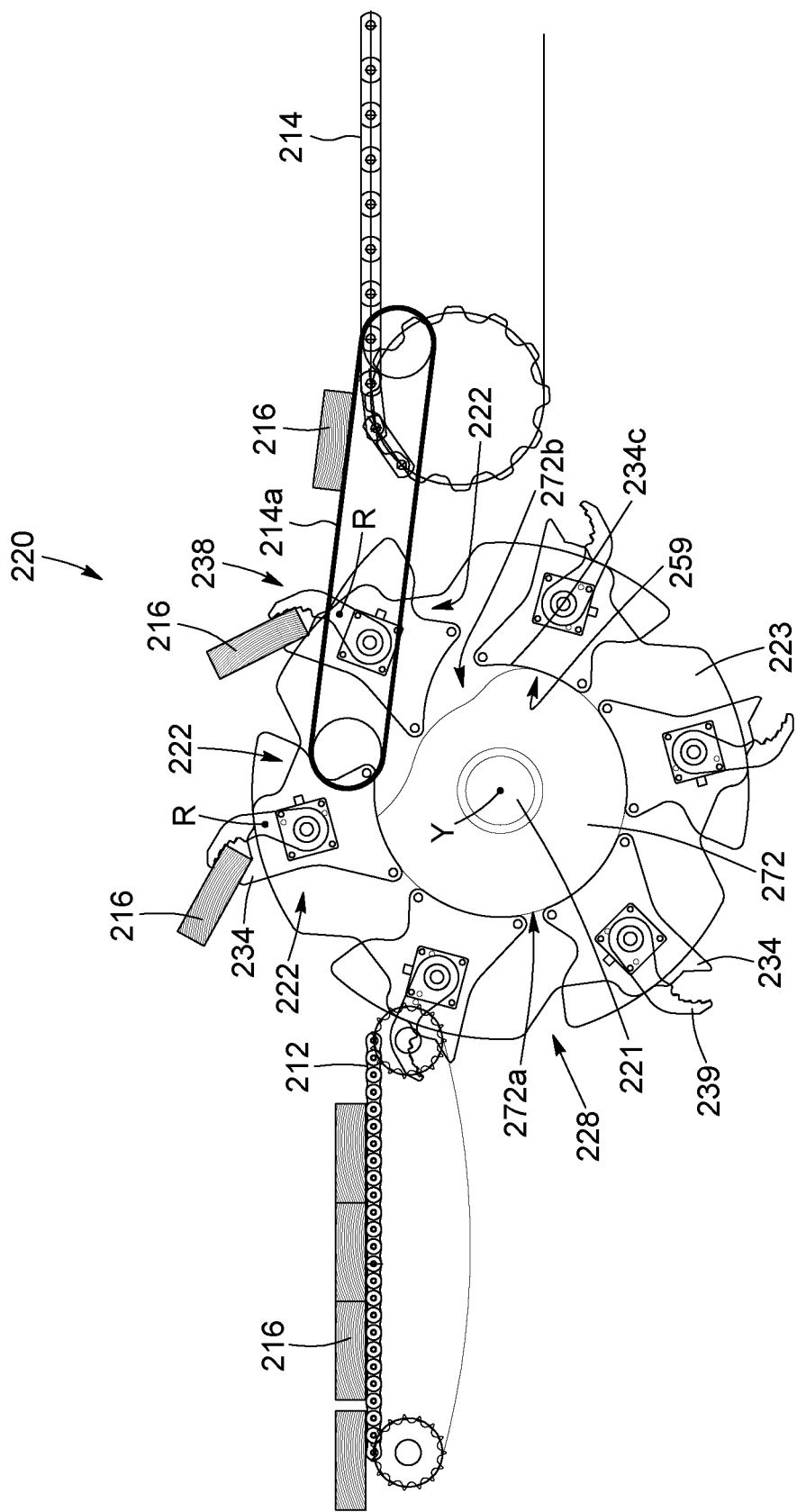
FIGS. 5A and 5B are side elevation views of a transfer wheel of the rotative lumber piece charger for transferring and angularly positioning lumber pieces, in accordance with another alternative embodiment, the rotative lumber piece charger being shown with the lumber supporting member positioned at a rotative release position oriented in a first angular orientation in FIG. 5A and with the lumber supporting member positioned at the rotative release position oriented in a second angular orientation in FIG. 5B.
Figure 5B:
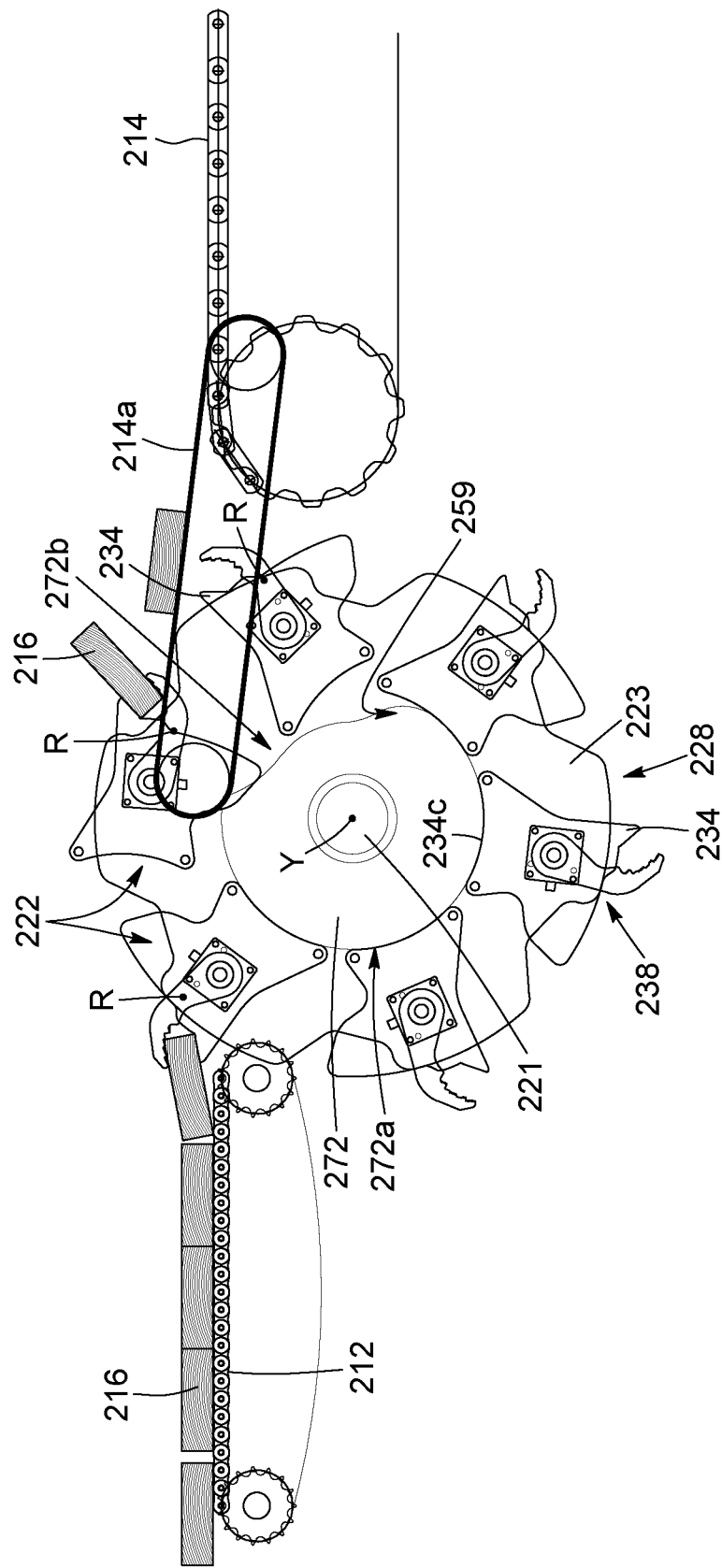

Now referring to FIGS. 5A and 5B, there is shown another alternative embodiment of the rotative lumber piece charger 220 wherein similar features are numbered using the same reference numerals in the 200 series. FIGS. 5A and 5B show the rotative lumber piece charger 220 with the lumber piece grasping assembly 222 positioned closest to the second carrier assembly 214 (i.e. the lumber piece grasping assembly 222 positioned at the rotative release position) configured in a first angular orientation (FIG. 5A) and in a second angular orientation (FIG. 5B). In the first angular configuration shown in FIG. 5A, the lumber piece 216 is angularly oriented to be released in the same orientation as the orientation it was grasped, while in the second angular configuration shown in FIG. 5B, the lumber piece 216 is angularly oriented to be released in the opposite orientation as the orientation it was grasped (i.e. the lumber piece 216 is turned). Several intermediate angular orientations can be reached between the angular configurations shown in FIGS. 5A and 5B.

The rotative lumber piece charger 220 is highly similar to the rotative lumber piece charger 220 of the embodiment shown in FIGS. 4 and 4A, but presents a different configuration of the lumber supporting members 234 and the return mechanism 259. Similar elements to the above-described embodiment (e.g. the driving shaft 221, the transfer wheel 228, the main body 223, the rotatable lumber piece grasping assembly 222, the lumber grasping member 238, the angular orientation control system (not shown), including the rotative shafts (not shown) and the angular control actuators (not shown), or the like) will not be repeated herein.

In the embodiment of FIGS. 5A and 5B, the return mechanism 259 operative to drive each one of the lumber supporting members 234 back to an initial angular orientation, before the lumber supporting members 234 reach the rotative grasping position, includes a central abutment 272 having a lumber supporting member engaging section 272a and a lumber supporting member non-engaging section 272b. The central abutment 272 is a fixed abutment and does not rotate along with the driving shaft 221, such that the driving wheels including the main body 223 and the lumber supporting members 234 rotate around the central abutment 272. The lumber supporting member engaging section 272a of the central abutment 272 extends at least partially between the rotative release position of the lumber supporting member 234 and the rotative grasping position thereof. The lumber supporting members 234 each include an abutment surface 234c configured to abut with the central abutment 272 along the lumber supporting member engaging section 272a and drive the lumber supporting member 234 in the desired initial angular orientation before reaching the rotative grasping position. Along the lumber supporting member non-engaging section 272b, the central abutment 272 does not abut with the lumber supporting member 234 and therefore does not restrict the angular orientation of the lumber supporting member 234. Hence, the angular orienting of the lumber supporting member 234 is performed by the angular orientation control system (not shown), while the rotative positioning of the lumber supporting member 234 corresponds to the lumber supporting member non-engaging section 272b of the central abutment 272.

Figure 6A:
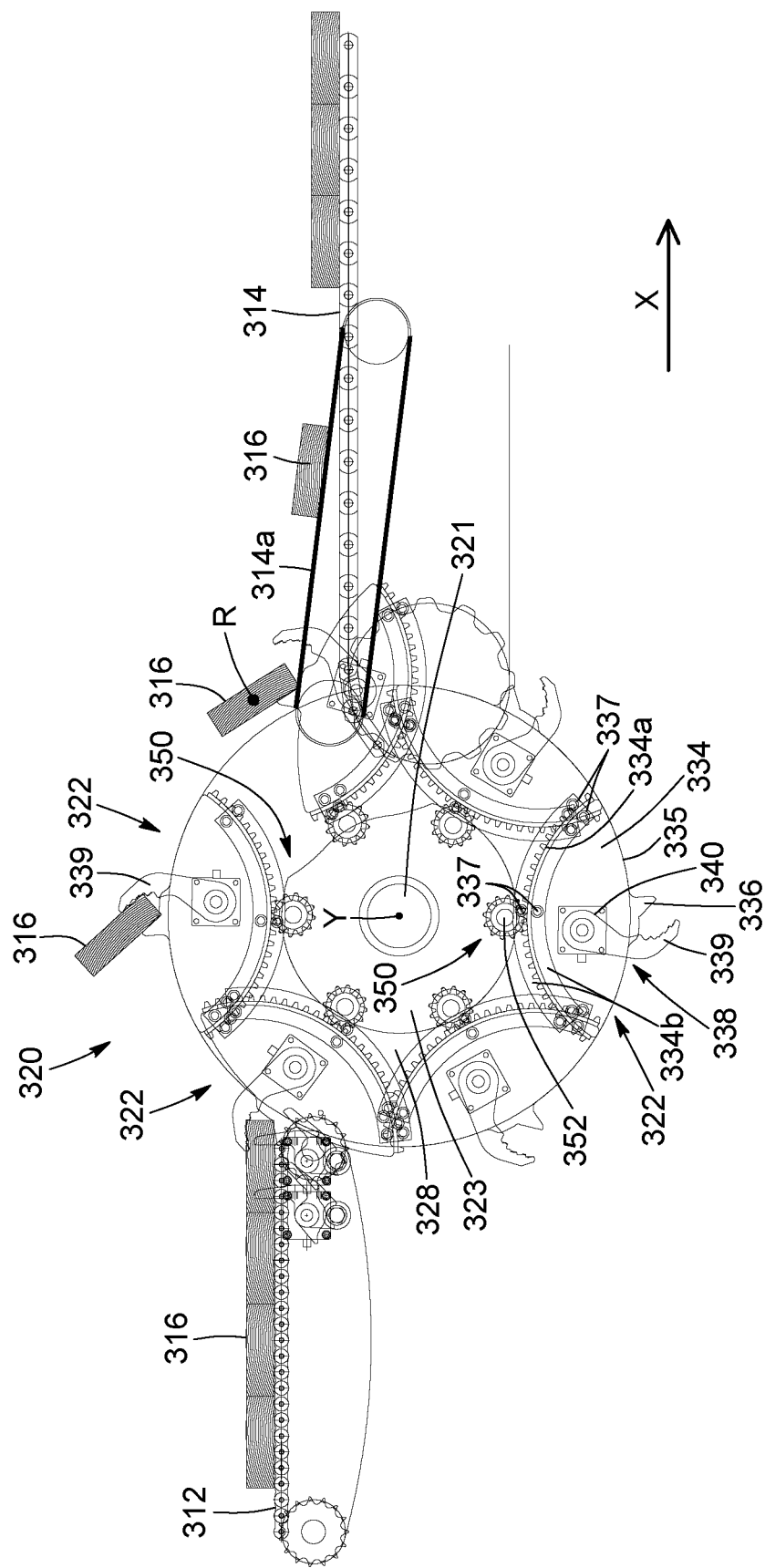
FIGS. 6A and 6B are side elevation views of a transfer wheel of the rotative lumber piece charger for transferring and angularly positioning lumber pieces in accordance with yet another embodiment, the rotative lumber piece charger being shown with the lumber supporting member positioned at a rotative release position oriented in a first angular orientation in FIG. 6A and with the lumber supporting member positioned at the rotative release position oriented in a second angular orientation in FIG. 6B.
Figure 6B:
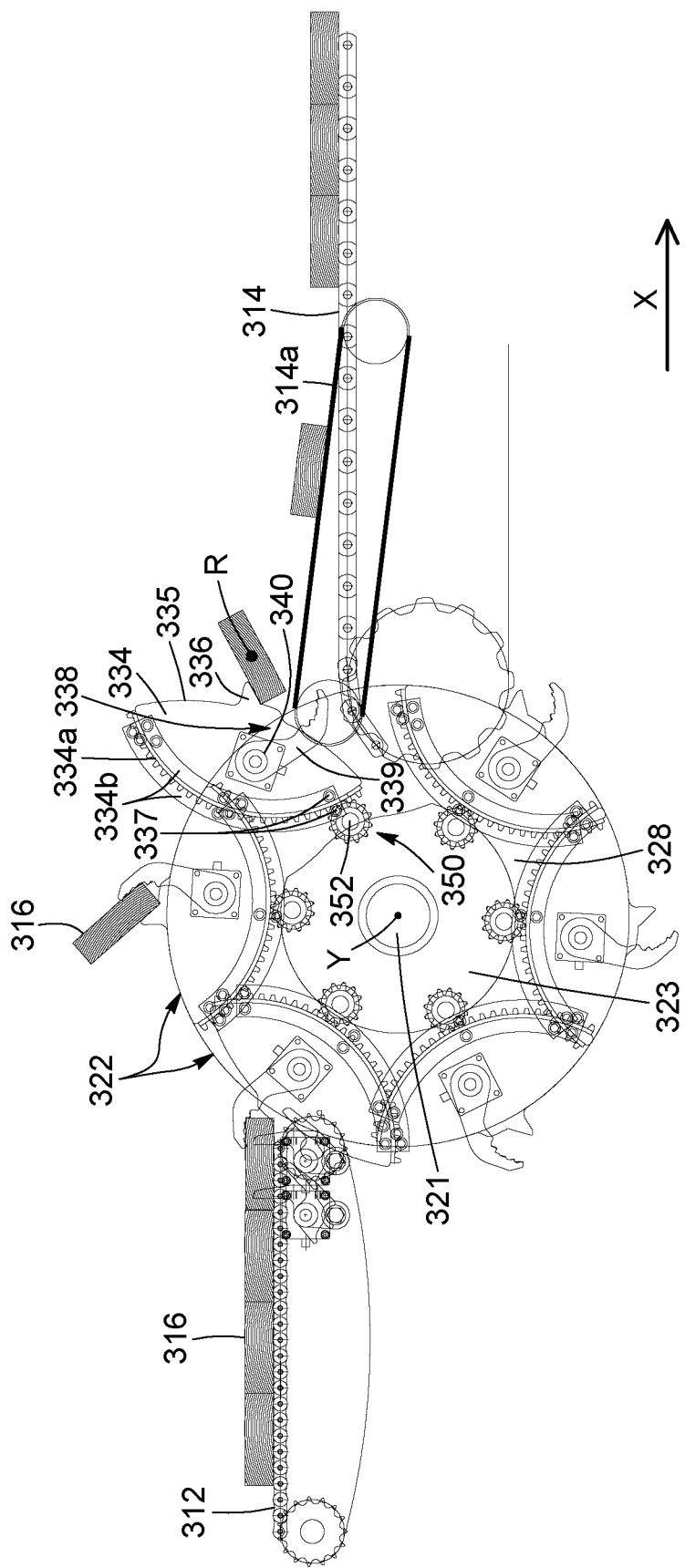

Now referring to FIGS. 6A and 6B, there is shown another alternative embodiment of the rotative lumber piece charger 320 wherein similar features are numbered using the same reference numerals in the 300 series.

FIGS. 6A and 6B show the rotative lumber piece charger 320 with the lumber piece grasping assembly 322 positioned at a rotative release position (i.e. the rotative position of the lumber piece grasping assembly 322 proximal to where the lumber pieces are released onto the second carrier assembly 314) configured in a first angular orientation (FIG. 6A) and in a second angular orientation (FIG. 6B). In the first angular orientation shown in FIG. 6A, the lumber piece 316 is angularly oriented to be released in the same orientation as the orientation it was grasped (i.e. the lumber piece 316 is released on the transitional carrier section 314A of the second carrier assembly 314 with the same face facing upwardly than on the first carrier assembly 312), while in the second angular orientation shown in FIG. 6B, the lumber piece 316 is angularly oriented to be released in the opposite orientation as the orientation it was grasped (i.e. the lumber piece 316 is turned to be released on the transitional carrier section 314A of the second carrier assembly 314 with the opposed face facing upwardly than when carried on the first carrier assembly 312). One skilled in the art will understand that several intermediate angular orientations can be reached between angular orientations shown in FIGS. 6A and 6B.

In the embodiment shown in FIGS. 6A and 6B, the lumber supporting member 334 has an outer edge 335 with a projecting tooth 336 extending substantially radially therefrom and engaging the first surface of the lumber piece 316. In the embodiment shown, the lumber grasping member 338, is again embodied by a pivoting finger 339 pivotable between an engaged configuration and a disengaged configuration. In the engaged configuration, the pivoting finger 339 is pivoted to engage the second surface of the lumber piece 316, thereby sandwiching a portion of the lumber piece 316 between the lumber supporting member 334 and the pivoting finger 339 and firmly maintaining the lumber piece 316 therebetween. In the disengaged configuration, the pivoting finger 339 is pivoted away from the second surface of the lumber piece 316 and is disengaged therefrom to release the lumber piece 316. Again, the pivoting finger 339 is connected to an actuator 340 pivoting the pivoting finger 39 between the engaged configuration and the disengaged configuration and vice-versa.

Again, the lumber grasping member 338 pivots about the lumber supporting member 334 between the engaged configuration and the disengaged configuration and rotates along with the lumber supporting member 334, when the lumber supporting member 334 is rotated about the lumber rotation axis R and relative to the main body 323 of the transfer wheel 328 of the rotative lumber piece charger 320. To allow rotation of the lumber supporting members 334 about the main body 323 of the transfer wheel 328, in the embodiment shown, the lumber supporting members 334 each include arcuate receiving slots 334B defined therein and configured to receive rollers 337 of the main body 323 therein. The rollers 337 are mounted at a fixed position onto the main body 323 and are displaceable into the arcuate receiving slot 334B of the corresponding lumber supporting member 334, when the lumber supporting members 334 is moved about the main body 323. The arcuate configuration of the receiving slots 334B causes the rotational movement of the lumber supporting member 334 about the lumber rotation axis R, when it is moved about the main body 323.

The rotative lumber piece charger 320 again includes an angular orientation control system 350 controlling the angular orientation of each lumber piece grasping assembly 322 relative to the rotating axis R. The angular orientation control system 350 of the embodiment shown differs from the one of the previous embodiments. In the embodiment shown in FIGS. 6A and 6B, the angular orientation control system 350 includes a driving wheel 352 driving the lumber supporting member 334 (and therefore also the lumber grasping member 338) in rotation. The driving wheel 352 is connected to an actuator (not shown) driving the driving wheel 352 in rotation. The driving wheel 352 is a toothed wheel engageable to a toothed peripheral surface 334A of the lumber supporting member 334, to drive the lumber supporting member 334 in rotation about the main body 323 of the transfer wheel 328, when rotated by the corresponding actuator (not shown). The toothed peripheral surface 334A of each lumber supporting member 334 is substantially parallel to the receiving slots 334B thereof.

The angular orientation control system 350 can again drive the lumber supporting member 334 in a first rotational direction when the driving wheel 352 is rotated clockwise and in a second rotational direction, opposed to the first rotational direction, when the driving wheel 352 is rotated counterclockwise.

Again, the angular orientation control system 350 can perform individual angular control of each lumber supporting member 334 during rotation of the driving shaft 321, thereby resulting in angular orienting of the corresponding lumber piece 316 grasped by the corresponding lumber piece grasping assembly 322, during its transfer between the first carrier assembly 312 and the second carrier assembly 314. In other words a rotation of the driving wheel 352 corresponding to the associated lumber supporting member 334 is performed by the corresponding actuator (not shown), concurrently to the rotation of the driving shaft 321 and the main body 323 mounted thereto, thereby allowing control of the angular orientation of each one of the lumber supporting member 334 and the associated lumber piece 316 during the time period spanning between the grasp of the lumber piece from the first carrier assembly 312 and the release of the lumber piece 316 onto the second carrier assembly 314.

Again, the control of the angular orientation of the corresponding lumber piece 316 grasped by the corresponding lumber piece grasping assembly 322, during its transfer between the first carrier assembly 312 and the second carrier assembly 314, can allow the rotative lumber piece charger 320 to selectively maintain the same orientation of the transferred lumber piece 316 or turn the transferred lumber piece 316 and independently of the horizontal position of a conveying surface of the first carrier assembly 312 and the second carrier assembly 314.

Once again, following the change in the angular orientation of the lumber supporting member 334 by the angular orientation control system 350, the lumber supporting member 334 is driven back to an initial angular orientation before reaching the rotative grasping position, for each complete rotation of the driving shaft 321.

Once again, in an embodiment, the rotative lumber piece charger 320 carries each transferred lumber pieces 316 between a grasping position and a release position along at least about 90° and less than about 270° and, in a particular embodiment, less than about 180°.

One skilled in the art will understand that, in alternative embodiments, the angular orientation control system 350 can be embodied by a driving mechanism different than the embodiment shown in FIGS. 6A and 6A and in the other embodiments above. Moreover, other possible rotative connection can be used for rotatably mounting the lumber supporting member 334 to the main body 323. For example and without being limitative, the receiving slots 334B and rollers 337 can be inverted between the lumber supporting member 334 and the main body 323, the lumber supporting member 334 could be mounted to a pivot (not shown), or the like.

One skilled in the art will also understand that the actuators (not shown) corresponding to each one of the driving wheels 352 and driving the driving wheels 352 in rotation are once again rotary actuators producing a rotary motion. Several types of rotary actuators can be used such as, without being limitative, an electric actuator (stepper motor, servomotor, etc.), a pneumatic actuator, a hydraulic actuator, or the like. Moreover, other mechanism for providing rotation thereof such as a cam mechanism could be used.

In the embodiment of FIGS. 6A and 6B, the return to the initial angular orientation can be performed by the driving wheel 352 driving the lumber supporting member 334 to the initial angular orientation.

Once again, in an embodiment, the rotative lumber piece charger 320 includes an electronic control system (not shown) operatively connected to the actuator 340 of the lumber grasping member 328 and/or the actuator of the angular orientation control system 350, such that the operations of the components of the lumber piece grasping assembly 322 and the angular orientation control system 350 for grasping, maintaining, angularly positioning and releasing the transferred lumber pieces 316 are synchronized. The electronic control system can also control the actuators to synchronize the movement of corresponding lumber piece grasping assembly 322 of multiple transfer wheels 328. The electronic control system can receive data relative to each lumber piece 316, for example from a vision system (not shown) to perform the specific angular orienting (e.g. to perform selective turning of the lumber piece 316 between the first carrier assembly 312 and the second carrier assembly 314) for each one of the lumber pieces 316 being transferred.

For ease of description, reference number in the 10 series will be used in the remaining of the description below. The rotative lumber piece charger 20 having been described above, a sequence of operation of the rotative lumber piece charger 20 for transferring and angularly orienting lumber pieces, in accordance with an embodiment, will now be described in more details below.

In operation, the lumber pieces 16 are successively conveyed transversally on the first carrier assembly 12 towards the rotative lumber piece charger 20.

In an embodiment, during the conveying and/or transfer of the lumber pieces 16 (or previous manutention thereof) each lumber piece 16 is scanned using a vision system 15 to generate optimization parameters thereof. In an embodiment, the optimization parameters are processed and orientation data corresponding to the desired angular orientation of the lumber piece is generated. In other words, using the optimization parameters, a desired angular orientation of the lumber piece 16 is determined (or calculated). For example and without being limitative, the desired angular orientation can correspond to an angular orientation corresponding to each one of the transferred lumber pieces 16 either being turned or maintained in the same orientation (i.e. angular orientation allowing selective turning of the lumber pieces 16) at a rotative release position (i.e. at a rotative position where the lumber piece is being released onto the second carrier assembly 14).

When each successive lumber piece 16 reaches the rotative lumber piece charger 20, in an embodiment, the lumber piece 16 is momentarily held against a stopper (not shown) until the rotative lumber piece charger 20 is ready to grasp the lumber piece 16. When the rotative lumber piece charger 20 is ready to grasp one of the successive lumber pieces 16, the stopper is retracted and the lumber piece 16 is grasped by one of the lumber piece grasping assemblies 22. The rotation of the driving shaft 21 subsequently rotates the transferred lumber piece 16 in a rotative motion of the main body 23.

During the transfer of the lumber piece 16 (i.e. during the rotation of the lumber piece grasping assembly 22 retaining the lumber piece resulting from the rotation of the corresponding transfer wheel 28 to which the lumber piece grasping assembly 22 is rotatably mounted), the corresponding lumber piece grasping assembly 22 is angularly oriented (i.e. rotated about a lumber rotation axis R) to angularly orient the lumber piece 16 in the previously determined desired angular orientation thereof. In other words, the lumber piece 16 is rotated about the lumber rotation axis R as it is held firmly by the lumber piece grasping assembly 22, as a result of the rotational movement of the lumber piece grasping assembly 22.

The lumber piece 16 is subsequently released from the lumber piece grasping assembly 22 onto the second carrier assembly 14 (or an alternative outlet) and is conveyed transversally on the second carrier assembly 14 away from the rotative lumber piece charger 20.

In an embodiment, the above-described steps are coordinated by a control system (not shown) based on the optimization parameters for each of the lumber pieces. One skilled in the art will understand that, in an alternative embodiment, other mechanism or method could be used to coordinate the operation of the components to perform the above-described steps.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

The invention claimed is:

1. A rotative lumber piece charger for transferring lumber pieces, the rotative lumber piece charger comprising:
    a driving shaft rotating about a longitudinal axis;
    a transfer wheel comprising a main body mounted to the driving shaft and rotating therewith;
    a lumber piece grasping assembly rotatably connected to the main body of the transfer wheel and rotatable with respect to the main body of the transfer wheel about a lumber rotation axis, the lumber piece grasping assembly being operative to grasp a section of a corresponding one of the lumber pieces, temporarily retain the section of the lumber piece and release the lumber piece; and
    an angular orientation control system connected to the lumber piece grasping assembly, the angular orientation control system controlling the rotational direction and angular travel distance of the lumber piece grasping assembly for selectively rotating the lumber piece grasping assembly about the lumber rotation axis.

2. The rotative lumber piece charger of claim 1, wherein the lumber piece grasping assembly comprises a lumber supporting member engaging a first surface of the corresponding lumber piece and a lumber grasping member selectively engageable to a second surface of the lumber piece, the lumber supporting member being rotatably connected to the main body of the transfer wheel to rotate about the lumber rotation axis and the lumber grasping member being rotatably connected to the lumber supporting member.

3. The rotative lumber piece charger of claim 2, wherein the angular orientation control system comprises an angular control actuator operatively connected to the lumber supporting member and driving the lumber supporting member in rotation about the lumber rotation axis, the angular control actuator being a rotative actuator.

4. The rotative lumber piece charger of claim 3, wherein the angular orientation control system comprises a rotative shaft connected to the angular control actuator, the lumber supporting member being mounted to the rotative shaft and the angular control actuator selectively driving the rotative shaft in rotation.

5. The rotative lumber piece charger of claim 4, wherein the angular control actuator is configured to monitor and control of the angular position of the rotary shaft and automatically drive the rotative shaft and the lumber supporting member to an initial angular orientation, before the lumber supporting member reaches a rotative grasping position, for each complete rotation of the driving shaft.

6. The rotative lumber piece charger of claim 2, wherein the angular orientation control system further comprises a return mechanism configured to drive the lumber supporting member to an initial angular orientation, before the lumber supporting member reaches a rotative grasping position, for each complete rotation of the driving shaft.

7. The rotative lumber piece charger of claim 1, wherein the rotative lumber piece charger comprises a plurality of lumber piece grasping assemblies angularly spaced apart along the main body of the transfer wheel and rotating independently about corresponding lumber rotation axis.

8. The rotative lumber piece charger of claim 1, wherein the main body of the transfer wheel includes two discs mounted to the driving shaft and longitudinally spaced apart along the longitudinal axis, each disc having at least one cavity sized and shaped to receive a section of a corresponding lumber piece therein.

9. A rotative lumber piece charger for concurrently transferring and angularly orienting lumber pieces being transferred along a conveying axis, the rotative lumber piece charger comprising:
 a driving shaft extending along a longitudinal axis and substantially perpendicular to the conveying axis;
 at least one transfer wheel mounted onto a corresponding section of the driving shaft and rotating therewith;
 at least one lumber piece grasping assembly configured to grasp a section of a corresponding one of the lumber pieces, temporarily retain the section of the lumber piece and release the lumber piece, the at least one lumber piece grasping assembly being rotatably connected to a corresponding one of the at least transfer wheel and being selectively rotatable about a lumber rotation axis extending substantially parallel to the longitudinal axis to change an angular orientation of the corresponding one of the lumber pieces as it is temporarily retained; and
 an angular orientation control system mounted to the corresponding one of the at least transfer wheel and operatively connected to a corresponding one of the at least one lumber piece grasping assembly, the angular orientation control system controlling the rotational direction and angular travel distance of the lumber piece grasping assembly for selectively rotating the corresponding lumber piece grasping assembly about the lumber rotation axis.

10. The rotative lumber piece charger of claim 9, wherein each one of the at least one lumber piece grasping assembly comprises a lumber supporting member engaging a first surface of the corresponding lumber piece and a lumber grasping member selectively engageable to a second surface of the lumber piece, the lumber supporting member being rotatably connected to the corresponding one of the at least one transfer wheel to rotate about the lumber rotation axis and the lumber grasping member being rotatably connected to the lumber supporting member.

11. The rotative lumber piece charger of claim 10, wherein the angular orientation control system comprises an angular control actuator operatively connected to the corresponding lumber supporting member and driving the lumber supporting member in rotation about the lumber rotation axis, the angular control actuator being a rotative actuator.

12. The rotative lumber piece charger of claim 11, wherein the angular orientation control system comprises a rotative shaft connected to the angular control actuator, the corresponding lumber supporting member being mounted to the rotative shaft and the angular control actuator selectively driving the rotative shaft in rotation.

13. The rotative lumber piece charger of claim 12, wherein the angular control actuator is configured to monitor and control of the angular position of the rotary shaft and automatically drive the rotative shaft and the lumber supporting member to an initial angular orientation, before the corresponding lumber supporting member reaches a rotative grasping position, for each complete rotation of the driving shaft.

14. The rotative lumber piece charger of claim 9, wherein the angular orientation control system further comprises a return mechanism configured to drive the corresponding lumber supporting member to an initial angular orientation, before the lumber supporting member reaches a rotative grasping position, for each complete rotation of the driving shaft.

15. The rotative lumber piece charger of claim 9, wherein the rotative lumber piece charger comprises a plurality of lumber piece grasping assemblies angularly spaced apart along the transfer wheel and rotating independently about a corresponding lumber rotation axis.

16. The rotative lumber piece charger of claim 9, wherein the transfer wheel includes a main body having two discs mounted to the driving shaft and longitudinally spaced apart along the longitudinal axis, each disc having at least one cavity sized and shaped to receive a section of a corresponding lumber piece therein.

17. A method for transferring and angularly orienting successive lumber pieces between a first carrier assembly and a second carrier assembly, for each one of the successive lumber pieces the method comprising the steps of:
 determining a desired angular orientation of the lumber piece at a rotative release position corresponding to a rotative position of a corresponding lumber piece grasping assembly for releasing the lumber piece onto the second carrier assembly;
 grasping the lumber piece from the first carrier assembly using the corresponding lumber piece grasping assembly;
 retaining the lumber piece by the lumber piece grasping assembly during rotative transfer by the lumber piece grasping assembly between the first carrier assembly and the second carrier assembly and concurrently controlling the rotational direction and angular travel distance of the lumber piece grasping assembly for selectively rotating the lumber piece grasping assembly about a lumber rotation axis and angularly orienting the lumber piece at the desired angular orientation; and
 releasing the lumber piece onto the second carrier assembly using the corresponding lumber piece grasping assembly.

18. The method of claim 17, wherein the step of determining the desired angular orientation of the lumber piece at a rotative release position comprises scanning the lumber piece using a vision system and generating optimization parameters.

19. The method of claim 18, wherein the step of determining a desired angular orientation of the lumber piece at a rotative release position includes processing the optimization parameters and generating orientation data corresponding to the desired angular orientation of the lumber piece.

20. The method of claim 17, further comprising the step of rotating a transfer wheel having the lumber piece grasping assembly rotatably mounted thereon to perform rotative transfer of the lumber piece by the lumber piece grasping assembly between the first carrier assembly and the second carrier assembly.

* * * * *